United States Patent
Tsou et al.

(10) Patent No.: US 11,396,575 B2
(45) Date of Patent: Jul. 26, 2022

(54) POLYESTER POLYOL, THERMOPLASTIC POLYURETHANE AND ARTICLE THEREOF

(71) Applicant: SUNKO INK CO., LTD., Taichung (TW)

(72) Inventors: Chiu-Peng Tsou, Taichung (TW); Zhen-Wei Chen, Taichung (TW); Wen-Wei Cheng, Taichung (TW); Ting-Ti Huang, Taichung (TW); Sheng-Mao Tseng, Taichung (TW)

(73) Assignee: SUNKO INK CO., LTD., Taichung (TW)

( * ) Notice: Subject to any disclaimer, the term of this patent is extended or adjusted under 35 U.S.C. 154(b) by 358 days.

(21) Appl. No.: 16/575,472

(22) Filed: Sep. 19, 2019

(65) Prior Publication Data

US 2021/0087326 A1 Mar. 25, 2021

(51) Int. Cl.
*C08G 18/46* (2006.01)
*C08G 18/42* (2006.01)
(Continued)

(52) U.S. Cl.
CPC ..... *C08G 18/4684* (2013.01); *C08G 18/7671* (2013.01); *C08G 63/6926* (2013.01)

(58) Field of Classification Search
CPC .................................. C08G 18/4684
See application file for complete search history.

(56) References Cited

U.S. PATENT DOCUMENTS 4,529,744 A 7/1985 Wood
5,128,197 A 7/1992 Kobayashi et al.

FOREIGN PATENT DOCUMENTS

CN 101410473 A 4/2009
CN 101743266 A 6/2010
(Continued)

OTHER PUBLICATIONS

DE-4316039-A1, Nov. 1993, English.*
(Continued)

*Primary Examiner* — Michael L Leonard
(74) *Attorney, Agent, or Firm* — WPAT, PC

(57) ABSTRACT

The present invention provides a thermoplastic polyurethane (TPU) having a glass transition temperature between an ambient temperature and normal body temperature, wherein the TPU contains dicarboxyphenyl polyester structure represented by Formula 1 or 10-(2,3-dicarboxypropyl)-9,10-dihydro-9-oxa-10-phosphaphenanthrene-10-oxide n(DOPO-ITA) polyester structure represented by Formula 2. The present invention also provides a polyester polyol containing DOPO-ITA polyester structure represented by Formula 2, a molar percentage of the 10-(2,3-dicarboxypropyl)-9,10-dihydro-9-oxa-10-oxide polyester structure in the whole polyester polyol ranges from 30% to 70%.

The present invention further provides an article thereof.

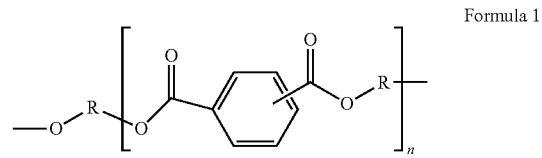

Formula 1 in Formula 1, R is C2 to C8 alkylene group or $CH_2CH_2OCH_2CH_2$;

(Continued)

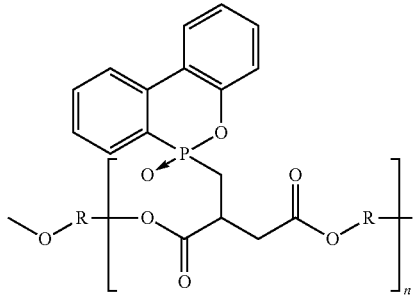

Formula 2 in Formula 2, R is C2 to C8 alkylene group or $CH_2CH_2OCH_2CH_2$.

18 Claims, 18 Drawing Sheets

(51) Int. Cl.
*C08G 18/76* (2006.01)
*C08G 63/692* (2006.01)

(56) References Cited

FOREIGN PATENT DOCUMENTS

| CN | 101914854 A | | 12/2010 | |
|----|----|----|----|----|
| CN | 104927038 A | * | 9/2015 | |
| CN | 105492534 A | * | 4/2016 | ............ C09J 175/04 |
| CN | 104448202 B | * | 12/2016 | |
| DE | 2816100 A1 | | 10/1978 | |
| DE | 4316039 A1 | * | 11/1993 | ......... C08G 18/7678 |
| JP | S53118497 A | | 10/1978 | |
| JP | 2000302847 A | * | 10/2000 | |
| JP | 2005060489 A | | 3/2005 | |
| JP | 2014084383 A | * | 5/2014 | |
| TW | 200413459 A | | 8/2004 | |
| TW | I614306 B | | 2/2018 | |

OTHER PUBLICATIONS

CN-105492534-A, Apr. 2016, English.*
JP-2014084383-A, May 2014, English.*
CN-104927038-A, Sep. 2015, English.*
Stepan Company, Stepanpol PD-56 Product Bulletin, published in 2015.
Stepan Company, Stepanpol PH-56 Product Bulletin, published in 2012.

* cited by examiner

POLYESTER POLYOL, THERMOPLASTIC POLYURETHANE AND ARTICLE THEREOF

BACKGROUND OF THE INVENTION

1. Field of the Invention

The invention relates to a thermoplastic polyurethane (hereinafter abbreviated as TPU) containing a dicarboxyphenyl polyester structure or 10-(2,3-dicarboxypropyl)-9,10-dihydro-9-oxa-10-phosphaphenanthrene-10-oxide polyester structure, and the glass transition temperature of the TPU is between an ambient temperature and normal body temperature; besides, the invention also relates to a polyester polyol containing 10-(2,3-dicarboxypropyl)-9,10-dihydro-9-oxa-10-phosphaphenanthrene-10-oxide polyester structure, which is used to prepare the above TPU. The invention also relates to a solvent-free hot adhesive, nonwoven fabric and article made of the TPU.

2. Description of the Prior Arts

Thermoplastic polyurethanes are widely used in the commodity sectors, such as furniture, footwear, textiles, household goods, automobiles and outdoors equipment. They have a structure of a macromolecular backbone containing a urethane group (—NH—CO—O—), which is a typical multi-block linear polymer, and are normally prepared by the addition of a diisocyanate, a polyol and a diol (hereinafter also referred to as a chain extender). The polyol segment in the polyurethane structure, also known as the soft segment, has a soft, long chain that brings a good elongation property to the TPU, and the segment formed by the addition of diisocyanate and diol is called a hard segment. The hard segment is liable to form a hydrogen bond, which is beneficial to produce an ordered structure (a crystalline phase) to form physical crosslinks between molecules. The material structure between the soft segment and the hard segment is gradually melted in the heated environment, so that the physical crosslinking between the molecules is reduced, and the polymer will be softened and plasticized, and usually processed by injection molding, extrusion molding, melt blowing, calendering, etc., and then a molded article is obtained after cooling and solidifying.

In the prior art, aliphatic polyester polyol or aliphatic polyether polyol is commonly used as soft segment materials in the TPU. The soft segment accounts for the weight of TPU and the molecular weight of the selected polyester polyol or polyether polyol affects the glass transition temperature (hereinafter abbreviated as Tg) and the crystallization temperature (hereinafter abbreviated as Tc) of the TPU. For example, when the weight ratio of the soft segment and the molecular weight of the polyester polyol increase, the Tg of the obtained TPU tends to be lower, as well as the crystallinity, and then the TPU will be softer; on the other hand, if the hard segment is used in a high proportion, that is, using more chain extender, the crystallinity of the polymer will be increased, thereby improving hardness and modulus of the material, and the Tg will also increase. The Tg of a common commercial TPU product is usually below −10° C., even below −40° C. However, if the Tc and the Tg are low, when PTU is used as a hot melt adhesive, it usually takes a longer molding time after melt blowing or forming extrusion film, and is easy to stick to each other during rolling, and therefore requires collecting by a release paper and release cloth. The process is complicated and costly; besides, when TPU is directly used as a non-woven fabric, a film material, or as a hot-melt adhesive to a fabric, TPU is often cohesively shrunk because of a slow setting time, leading to a fabric wrinkle.

The invention aims to prepare a TPU by using a polyester polyol as soft segment material, and the soft segment contains at least a dicarboxyphenyl polyester structure or a 10-(2,3-dicarboxypropyl)-9,10-dihydro-9-oxa-10-phenanthrene-10-oxide (hereinafter referred to as a DOPO-ITA) polyester structure. The existent technology is discussed below.

For example, German Patent DE2816100C2 discloses a flame retardant, a polyester polyols obtained by adding DOPO or a derivative thereof and itaconic acid and then condensated with a polyol, which has a molecular weight of 1,000 to 20,000 g/mole and a phosphorus content of 5.3 to 8.5 wt %, which is a glassy crystal at normal temperature. The specification mentions that it can be added as a flame retardant to thermoplastic resins such as polystyrene (PS), polycarbonate (PC), polymethyl methacrylate (PMMA), and polyvinyl chloride (PVC), acrylonitrile-butadiene-styrene copolymer (ABS), etc., to improve its flame retardancy. It is mentioned that the molar ratio of the DOPO-ITA to ethylene glycol is made 1 to 3, the excess ethylene glycol is removed by heating under reduced pressure after refluxing, then nitrogen and germanium oxide ($GeO_2$) is added as a catalyst, and the temperature is raised to 230° C. to obtain a polyester polyol containing a DOPO-ITA structure, CAS: 68664-61-9, having a chemical formula of $(C_{17}H_{15}O_6P.C_2H_6O_2)_x$, a Tg of about 60° C. and an average molecular weight (Mn) of 4500. The DOPO-containing polyester polyol has high softening temperature and high viscosity, so it is not appropriate as a soft segment raw material for the TPU of the present invention.

U.S. Pat. No. 4,529,744 discloses an aromatic polyester polyol, which is a dicarboxyphenyl polyester polyol. The specification also discloses its compositions, preparing methods and applications for PU foaming. At present, the dicarboxyphenyl polyester polyol has been commercialized, which contributes to foaming and solidifying when applied to solvent polyurethane (hereinafter abbreviated as PU).

U.S. Pat. No. 5,128,197 discloses a fabric of shape memory polymer in which fibers are made of a polyurethane elastomer having a shape memory function. The specification mentions that an elastomer would undergo an elastic modulus change near the glass transition point of about 40° C., which becomes rubbery at a temperature above Tg, and becomes glass at a temperature below Tg. The elastomer is memorized into a basic shape after the fabric is deformed at a temperature below Tg, so the shape of the fabric can be changed and recovered by heating to a specific temperature. The specification suggests aromatic glycol used as a chain extender, such as bis(2-hydroxyethyl)hydroquinone, has a significant effect on improving Tg, and also suggests the use of aromatic polyglycols, for example, bisphenol A and propylene oxide copolymers are used as soft segments, besides, aromatic glycol, for example, bisphenol A and propylene oxide copolymers can be used as soft segments, but the specification also mentions that fabrics of high Tg are not preferred to contact the skin due to their rigidity.

Taiwan Patent No. 200413459 provides a method for preparing a water-reducible phosphorus-containing polymer precursor, which uses a raw material for a polyacrylic acid-urethane prepolymer to produce the water-reducible phosphorus-containing polymer precursor and coating formula applied in resisting corrosion and retarding flame. The specification refers to a polyester glycol containing DOPO-ITA structure, including CAS 455333-14-9, the chemical formula is $(C_{17}H_{15}O_6P \cdot C_6H_{14}O_2)_x$, and CAS 455333-15-0, and the chemical formula is $(C_{17}H_{15}O_6H_{10}O_4 \cdot C_6H_{14}O_2)_x$. The preparing method provided by the specification is that 2-methylidenebutanedioic acid (hereinafter also referred to as itaconic acid), 1,6-hexanedioic acid, DOPO, antioxidant 1,4-dihydroxybenzene and tin catalyst at different ratios were heated at 110° C. for 4 hours under nitrogen, then heated to 180° C. until no water was distilled, removing residual water by heating for 8 hours under vacuum, until all DOPO was traced by $^{31}$P-NMR (nuclear magnetic resonance) to add the unsaturated bond of itaconic acid. According to the embodiments, its acid value is more than 5 mg of potassium hydroxide per gram (mg KOH/g). The acid value of the polyester polyol containing the DOPO-ITA structure obtained by this method is too high to be a soft segment raw material of the TPU.

China patent CN101743266A provides a polyester polyol with an average molecular weight of more than 20,000 made from DOPO, which is a glassy polymer at normal temperature. It can be applied to polyamide fibers (such as PA6, PA12 and PA66) for melt spinning and polyester fiber (PET), which can improve the flame retardancy due to its good solubility, but it cannot be used in polyurethane (PU). It is mentioned in the specification that after DOPO-ITA and excess ethylene glycol are refluxed to remove water, the excess ethylene glycol is removed by heating and decompression, and then inject nitrogen and add a trace amount of germanium oxide ($GeO_2$) and trimethylolpropane dissolved in ethylene glycol, a polyester polyol containing DOPO-ITA structure is obtained after the temperature is increased to 260° C., whose softening point is about 100° C. to 130° C. and the Tg is higher than 60° C., and therefore it is not suitable as a soft segment raw material for the TPU Further, China Patent CN101914854 provides a solvent-type waterproof and moisture permeable polyurethane (PU), which is composed of 18.5% to 19.5% aliphatic polyester polyol, 34.0% to 35% polyether polyol, 7.0% to 8.0% butylene glycol, 26.5% to 29.0% 4,4'-diisocyanate diphenylmethane and various additives, and the ambient temperature higher than the Tg of the polyurethane contributes to improving moisture permeability, which helps the wearer feel comfortable with perspiration. When the cold ambient temperature is lower than the Tg of the polyurethane, it has a warmth-preservation function under low temperature.

Japan Patent JPS53118497A discloses a solvent-type polyurethane, the examples in the specification provide a method for preparing a polyester polyol containing a DOPO-ITA structure, wherein DOPO, itaconic acid and ethylene glycol are mixed and heated from 120° C. to 180° C. (heating rate: 20° C. per hour), water is distilled by vacuum at 200° C., excess ethylene glycol is added to adjust the OH value to 106.7 mg KOH/g, Acid value to 2.5 mg KOH/g, and then polymerized with diphenylmethane isocyanate (also referred to as MDI) in dimethylforamide (DMF) to obtain a polyurethane with flame retardant function (CAS 69068-45-7). The polyester polyol obtained by adjusting the hydroxyl value by excess ethylene glycol by this method is difficult to control the ratio of soft segments to hard segments of the polyurethane.

Taiwan Patent No. I614306B discloses an adhesive composition of a solvent-type polyurethane and an epoxy resin, which is applied to the printed circuit board industry. The specification discloses a polyester polyol composition prepared by two or more polycarboxylic acids such as DOPO-ITA, phthalic acid and two or more kinds of polyols with lower molecular weight, which has a number average molecular weight (Mn) of 8,000 to 16,000 and a Tg higher than room temperature, and is further reacted with a chain extender and an isocyanate dissolved in one or more solvents to form a polyurethane having a specific high acid value range whose Tg is between −20° C. to 100° C. The specification further reveals the lower limit of the Tg is preferably −10° C., more preferably 0° C., while the upper limit is preferably 80° C., more preferably 60° C. The polyester polyol containing the DOPO-ITA structure mentioned above has high molecular weight, high viscosity and high acid value, so it is not suitable for the soft segment raw material of the TPU.

China patent CN104927038A provides a solvent-free one-pot method, in which DOPO and small molecule polyhydric alcohol are put in a reactor; the air is first purged by nitrogen, heated to 90° C. until the DOPO is completely dissolved, and then cooled to 70 to 80° C. Add an unsaturated dibasic acid (such as itaconic acid) or anhydride to react for 4 to 6 hours, add dibasic acid and antioxidant (triphenylphosphorus) at 100 to 140° C. and carry out the reaction for 3 to 12 hours, and then the temperature is gradually increased to 180° C. for 2 to 6 hours, the temperature is further increased to 200° C. for 3 to 4 hours, and finally an organometallic catalyst (for example, titanate) is added and the water is removed by vacuum for 3 to 4 hours. A polyester polyol containing DOPO-ITA having an acid value of less than 5 mg KOH/g is obtained, but the acid value is too high to be a soft segment raw material of the TPU.

Viewing the current public literature and commercial products, a TPU and article thereof whose Tg is between an ambient temperature and normal body temperature have not been seen, we are attracted to develop and realize one as fabrics, shoes, accessories, toys, sporting goods and daily necessities.

SUMMARY OF THE INVENTION

Accordingly, the present invention provides a thermoplastic polyurethane (TPU) and article thereof, which becomes rigid and stiff at ambient temperature and soft and elastic at normal body temperature, endowing some new tactility, fun and functions when applied to the textiles contacted with the human body (such as underwear, hats, label clothes, curtains, etc.), shoes, decorations (such as watchbands, wrist straps), toys, sporting goods and daily necessities.

The inventors have deliberately studied to achieve the aforementioned objective, and provide a TPU having a Tg between ambient temperature and normal body temperature, wherein the TPU contains a dicarboxyphenyl polyester structure represented by Formula 1 or a DOPO-ITA polyester structure represented by Formula 2; the dicarboxyphenyl polyester represented by Formula 1 and the DOPO-ITA polyester structure represented by Formula 2 each have an average molecular weight ranging from 700 to 2500 g/mole, more preferably, 1000 to 2000 g/mole;

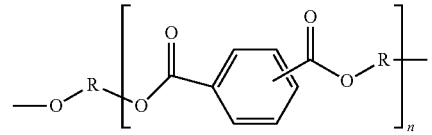

Formula 1 in Formula 1, R is C2 to C8 alkylene group or $CH_2CH_2OCH_2CH_2$;

Formula 2

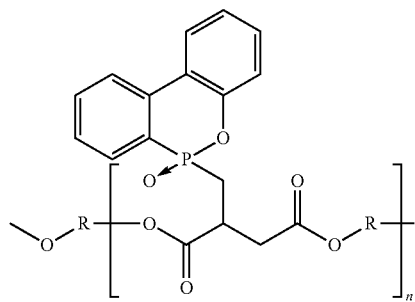

in Formula 2, R is C2 to C8 alkylene group or $CH_2CH_2OCH_2CH_2$.

The thermoplastic polyurethane contains a molar percentage of the dicarboxyphenyl polyester structure in the thermoplastic polyurethane ranging from 6% to 25%.

The thermoplastic polyurethane contains a molar percentage of the DOPO-ITA polyester structure in the thermoplastic polyurethane ranging from 5% to 20%.

Further, a weight percentage of a soft segment in the thermoplastic polyurethane ranges from 60% to 80%.

In the present invention, the ambient temperature refers to the temperature most suitable for human life, which is between 10° C. and 30° C.; and the normal body temperature refers to the surface temperature and core temperature of humans and higher mammals, which is between 30° C. and 40° C.

Moreover, the Tg of the thermoplastic polyurethane is between the ambient temperature and normal body temperature, that is, between 10° C. and 40° C., preferably between 15° C. and 28° C.

Moreover, the thermoplastic polyurethane of the present invention has a function of hot melt adhesive, and the softening point of TPU is between 50° C. and 100° C., preferably between 60° C. and 85° C.

The present invention further provides a solvent-free hot melt adhesive prepared by using the above TPU.

The present invention further provides a nonwoven fabric prepared by using the above TPU.

The present invention further provides an article produced by using the above TPU. The article can be textile, shoe material, decoration, toy, sporting goods and daily necessity.

In addition, the present invention provides a polyester polyol for producing the above TPU, wherein the TPU contains DOPO-ITA polyester structure represented by Formula 2, a molar percentage of the DOPO-ITA polyester structure contained in the polyester polyol in the polyester polyol ranges from 30% to 70%, and the average molecular weight (Mn) of the polyester structure ranges from 700 to 2500 g/mole.

Formula 2

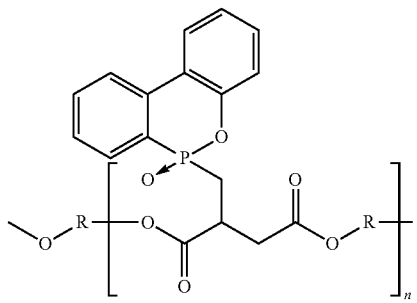

The polyester polyol containing DOPO-ITA polyester structure represented by the Formula 2 has an OH value between 160.3 and 44.8 mg of potassium hydroxide per gram (hereinafter expressed in mg KOH/g).

The dicarboxylic acid in the above DOPO-ITA polyester structure is an addition of itaconic acid and 9,10-dihydro-9-oxa-10-phosphaphenanthrene-10-oxide (DOPO), or an addition of itaconic acid, one selected from succinic acid or 1,6-adipic acid and DOPO.

The above polyol contained in the above polyester polyol containing DOPO-ITA polyester structure was selected from C2-C8 aliphatic polyol.

The above C2-C8 aliphatic polyol may be ethylene glycol, propylene glycol such as 1,2-propanediol and 1,3-propanediol, butanediol, 2-methyl-1,3-propanediol, diethylene glycol, 1,5-pentanediol, neopentyl glycol, 1,6-hexanediol, 1,4-cyclohexanediol, 2-ethylhexanediol, 1,8-octane diol or a combination thereof.

The above polyol contained in the above polyester polyol containing DOPO-ITA polyester structure is preferred to be selected from the polyester polyol of DOPO/itaconic acid/1,6-hexanediol (the chemical formula is $(C_{17}H_{15}O_6P\cdot C_6H_{14}O_2)_x$), the polyester polyol of DOPO/itaconic acid/diethylene polyol (the chemical formula is $(C_{17}H_{15}O_6P\cdot C_4H_{10}O_3)_x$), the polyester polyol of DOPO/itaconic acid/adipic acid/hexamethylene glycol (the chemical formula is $(C_{17}H_{15}O_6P\cdot C_6H_{10}O_4\cdot C_6H_{14}O_2)_x$), the polyester polyol of DOPO/itaconic acid/succinic acid/diethylene glycol (the chemical formula is $(C_{17}H_{15}O_6P\cdot C_4H_6O_4\cdot C_4H_{10}O_3)_x$) represented by the following Formula 3 or a combination thereof;

Formula 3

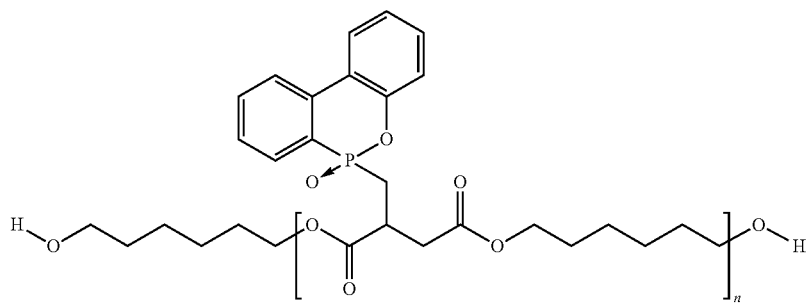

$(C_{17}H_{15}O_6P\cdot C_6H_{14}O_2)_x$

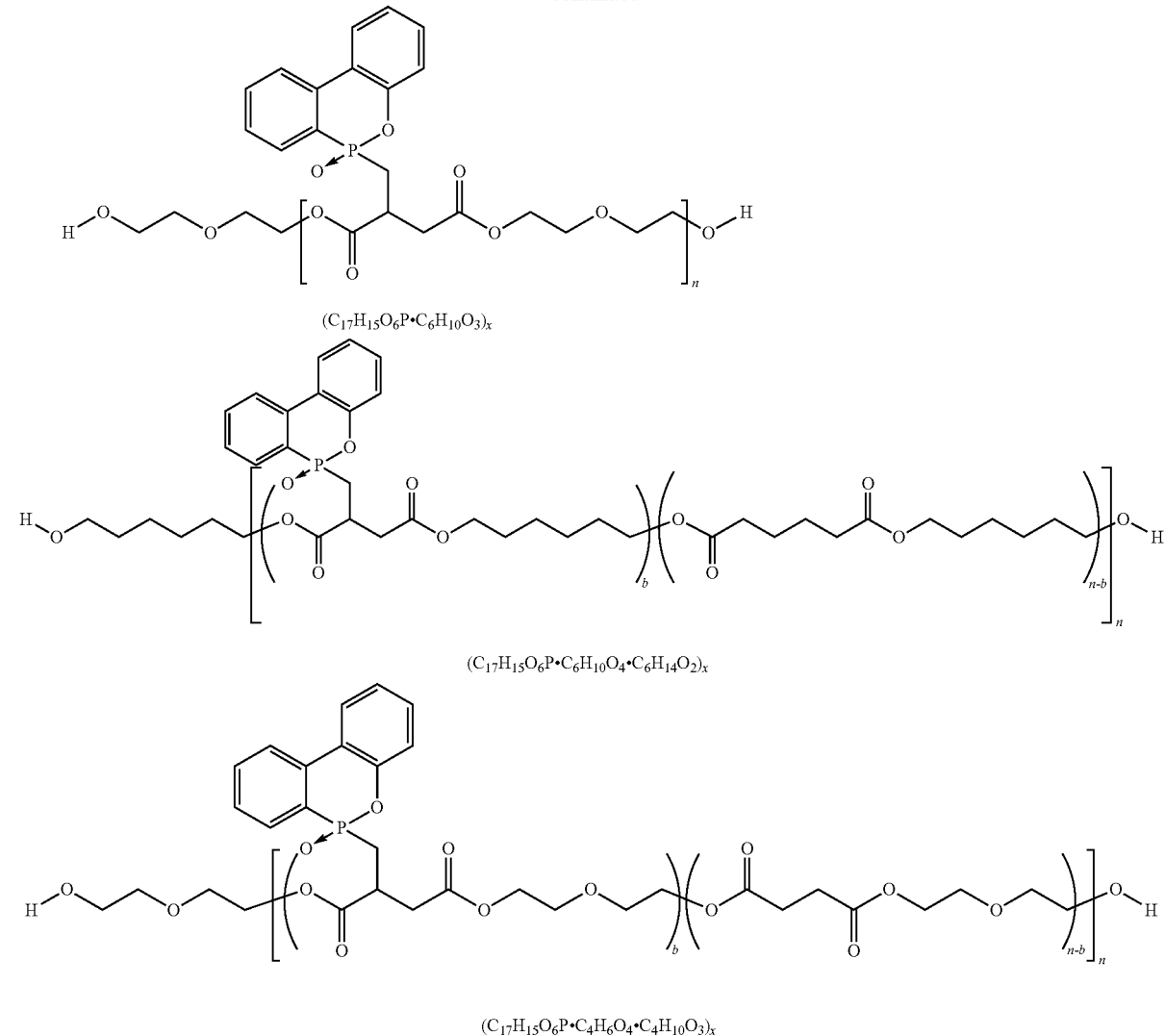

wherein n ranges from 1 to 10, x ranges from 1 to 10, b ranges from 1 to 6.

The polyester polyol selected from any one or a combination of the polyester polyol represented by the Formula 3 has an acid value less than 1.8 mg KOH/g.

According to the present invention, the TPU of the present invention can be obtained by a method: mixing the polyol composition including a dicarboxyphenyl polyester structure or a DOPO-ITA polyester structure (hereinafter referred to as polyol composition), chain extender and organic diisocyanate and heating them at the molar ratio of 0.95≤organic diisocyanate/(polyol composition+chain extender)≤1.10.

According to the present invention, the TPU having a function of the hot melt adhesive can be obtained by a method: mixing the polyol composition, chain extender and organic diisocyanate at a preferred ratio, that is, the weight ratio of the polyol composition is 60%≤polyol composition/(polyol composition+chain extender+organic diisocyanate) ≤80%, and the molar ratio is 0.98≤the organic diisocyanate/(polyol composition+chain extender)≤1.05.

According to the present invention, the polyol composition not only has polyester polyol containing a dicarboxyphenyl polyester structure or DOPO-ITA polyester structure, but also an aliphatic polyol may be optionally combined.

The polyester polyol containing a dicarboxyphenyl polyester structure of the present invention, wherein a dicarboxylic acid phenyl monomer of the polyester polyol is preferably selected from the group of 1,2-phthalic acid, 1,3-phthalic acid, 1, 4-phthalic acid, phthalic anhydride, or the like, a polyol monomer of the polyester polyol is preferably selected from the group consisting of C2-C8 aliphatic diols, including ethylene glycol and propylene glycol such as 1,2-propanediol and 1,3-propanediol, butanediol, 2-methyl-1,3-propanediol, diethylene glycol, 1,5-pentanediol and neopentyl glycol, 1,6-hexanediol, 1,4-cyclohexanediol, 2-ethylhexanediol, 1,8-octane diol or a combination thereof.

Preferably, the polyester polyol containing a dicarboxyphenyl polyester structure is a polyester polyol of 1,2-phthalic acid/diethylene glycol (CAS No. 25916-41-0, the chemical formula is $(C_8H_6O_4 \cdot C_4H_{10}O_3)_x$), a polyester polyol of 1,2-phthalic acid/hexanediol (CAS No. 27516-71-8, the chemical formula is $(C_8H_6O_4 \cdot C_6H_{14}O_2)_x$), a polyester polyol of 1,4-phthalic acid/1,6-hexanedioic acid/diethylene glycol (the chemical formula is ($C_8H_6O_4 \cdot C_6H_{10}O_4 \cdot C_6H_{14}O_2)_x$). More preferably, the polyester polyol has an OH value between 160.3 and 56.1 mg KOH/g, a molar average molecular weight ranging from 700 to 2000 g/mol, and an acid value of <1 mg KOH/g.

Further, for the polyester polyol containing DOPO-ITA polyester structure, the dicarboxylic acid thereof is preferably a combination of an addition of itaconic acid and 9,10-dihydro-9-oxa-10-phosphaphenanthrene-10-oxide (DOPO), succinic acid or 1,6-hexanedioic acid, etc., wherein the ratio of the DOPO-ITA polyester structure relative to the whole of the polyester polyol, in terms of mole percentage, ranges from 30% to 70%, and the glycol monomer is selected from the C2-C8 aliphatic diols, including ethylene glycol, propylene glycol such as 1,2-propylene glycol and 1,3-propanediol, butanediol, 2-methyl-1,3-propanediol, diethylene glycol, 1,5-pentanediol and neopentyl glycol, 1,6-hexanediol, 1,4-cyclohexanediol, 2-ethylhexanediol, 1,8-octane diol or a combination thereof.

In the present invention, the aliphatic polyol includes, but is not limited to, polyethylene glycol, modified polyethylene glycol, polypropylene glycol, polytrimethylene ether glycol, polytetramethylene ether glycol (PTMEG), polyhexylene succinate (PHS), polybutylene adipate (PBA), polyethylene butylene adipate (PEBA), polybutylene hexylene adipate (PBHA), polycaprolactone diol, and a combination thereof. Among them, the PBA having an OH value of 160.3 to 56.1 mg KOH/g, a molecular weight (Mn) of 700 to 2000 g/mol and an acid value of <0.5 mg KOH/g is preferred.

In the present invention, the organic diisocyanate includes, but is not limited to, 4,4'-diphenylmethane diisocyanate (MDI), dicyclohexylmethane diisocyanate (HDI) and a combination thereof. Among them, MDI is preferred.

In the present invention, the chain extender used refers to an aliphatic polyol, including but not limited to a monomer selected from C2 to C8 aliphatic polyol, including ethylene glycol, propylene glycol such as 1, 2-propanediol and 1,3-propanediol, butanediol, 2-methyl-1,3-propanediol, diethylene glycol, 1,5-pentanediol, neopentyl glycol, 1,6-hexanediol, 1,4-cyclohexanediol, 2-ethylhexanediol, 1,8-octane diol and a combination thereof. Among them, 1,4-butanediol is preferred.

In the present invention, an auxiliary agent may be added in preparation of the TPU, including but not limited to an antioxidant, an UV absorber, a heat-resistant agent, a slip agent, a catalyst, a colorant, and a combination thereof.

The TPU containing the dicarboxyphenyl polyester structure provided can be used as a solvent-free hot melt adhesive, which has good adhesion to the polyester fabric, and more particularly, has excellent hydrolysis resistance. It can be used to develop products that are used for a long time and are often washed.

Further, the TPU containing 10-(2,3-dicarboxypropyl)-9,10-dihydro-9-oxa-10-phosphaphenanthrene-10-oxide (DOPO-ITA) can also be used as a solvent-free hot melt adhesive. The phosphorus atom contained in DOPO in its structure makes it intrinsically flame retardant and not migratable, and easily hydrolyze, so it is suitable for flame retardant textiles or easily-handled disposable items.

According to the present invention, a thermoplastic polyurethane having a Tg between the ambient temperature and normal body temperature and a molded article thereof can be provided, and since the Tg is higher than the ambient temperature, the articles thereof are easily-molded, less likely to wrinkle, and visually stiff when displayed or placed. On the other hand, because the Tg is lower than the normal body temperature, the article gives soft and comfortable feel when in contact with the human body. With the above characteristics, it is especially suitable for textiles (such as underwear, hats, label cloths, curtains, etc.), shoes, decorations (such as straps, wristbands, etc.), toys, sporting goods, daily necessities and so on, and thereby providing consumers with a new touch, fun and function.

Further, according to the present invention, a polyester polyol for producing the above TPU may also be provided.

DETAILED DESCRIPTION OF THE PREFERRED EMBODIMENTS

Figure 1:
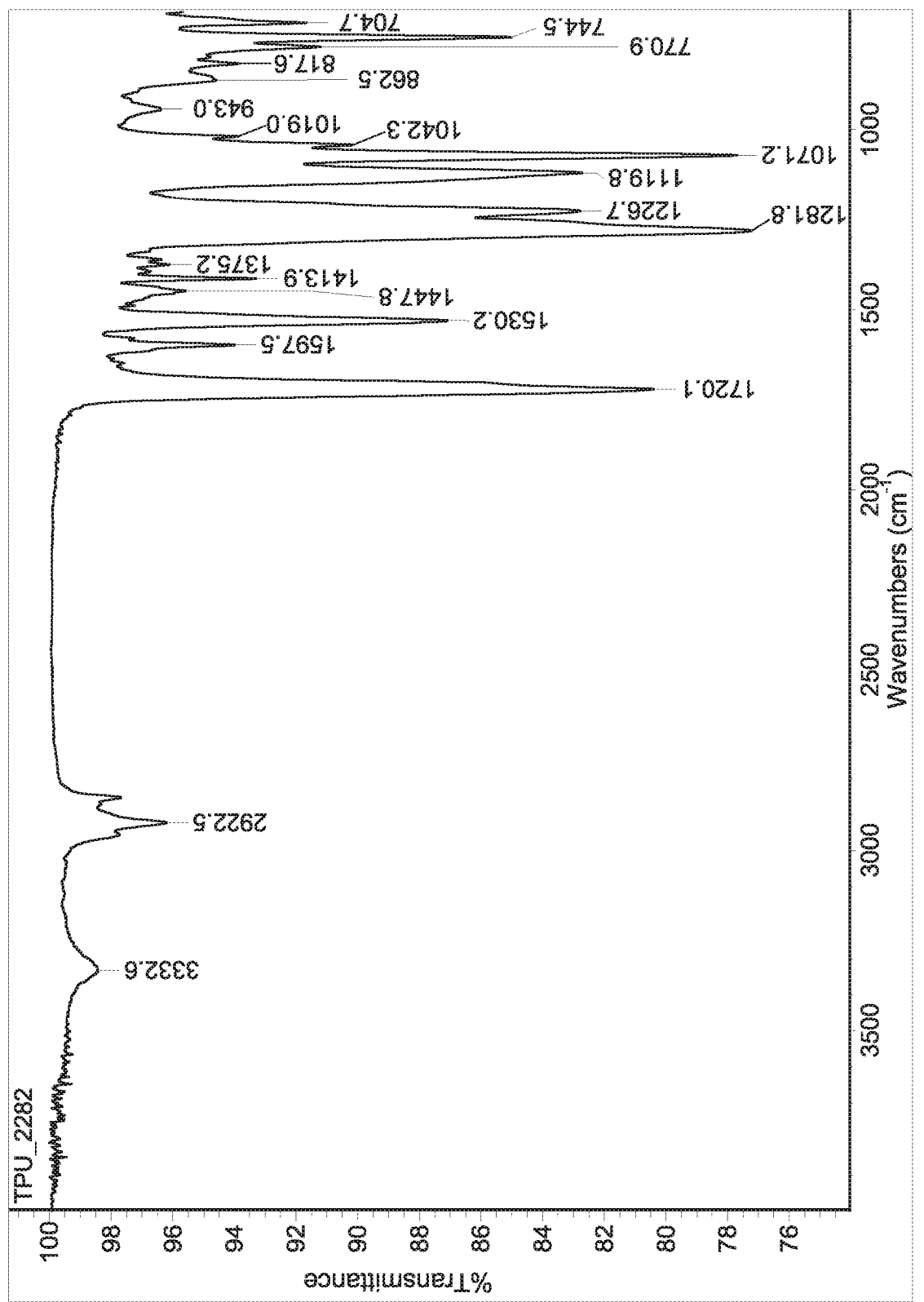
FIG. 1 is an infrared spectrum of TPU containing a dicarboxyphenyl polyester structure of Example 7.
Figure 2:
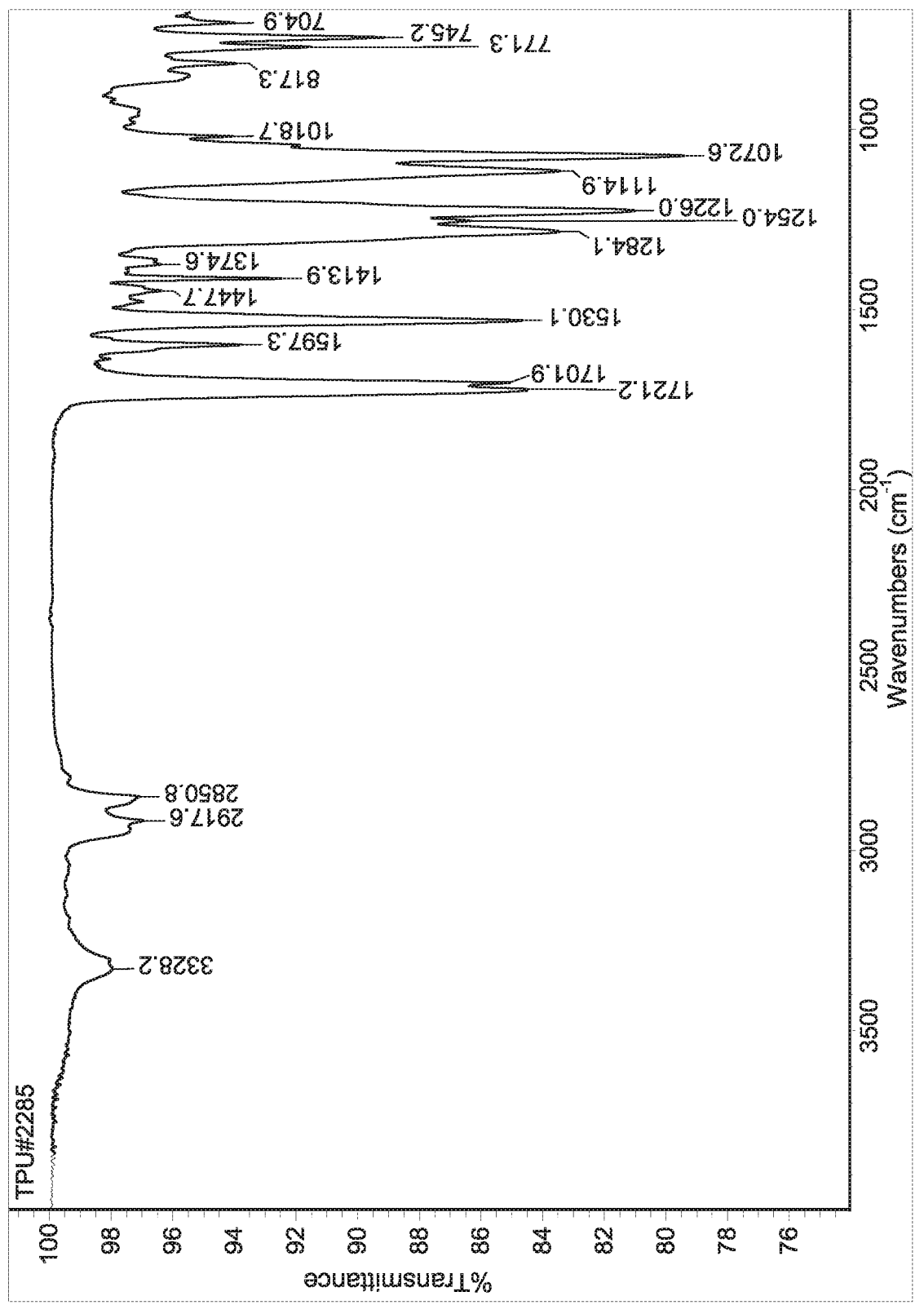
FIG. 2 is an infrared spectrum of TPU containing a dicarboxyphenyl polyester structure of Example 8.
Figure 3:
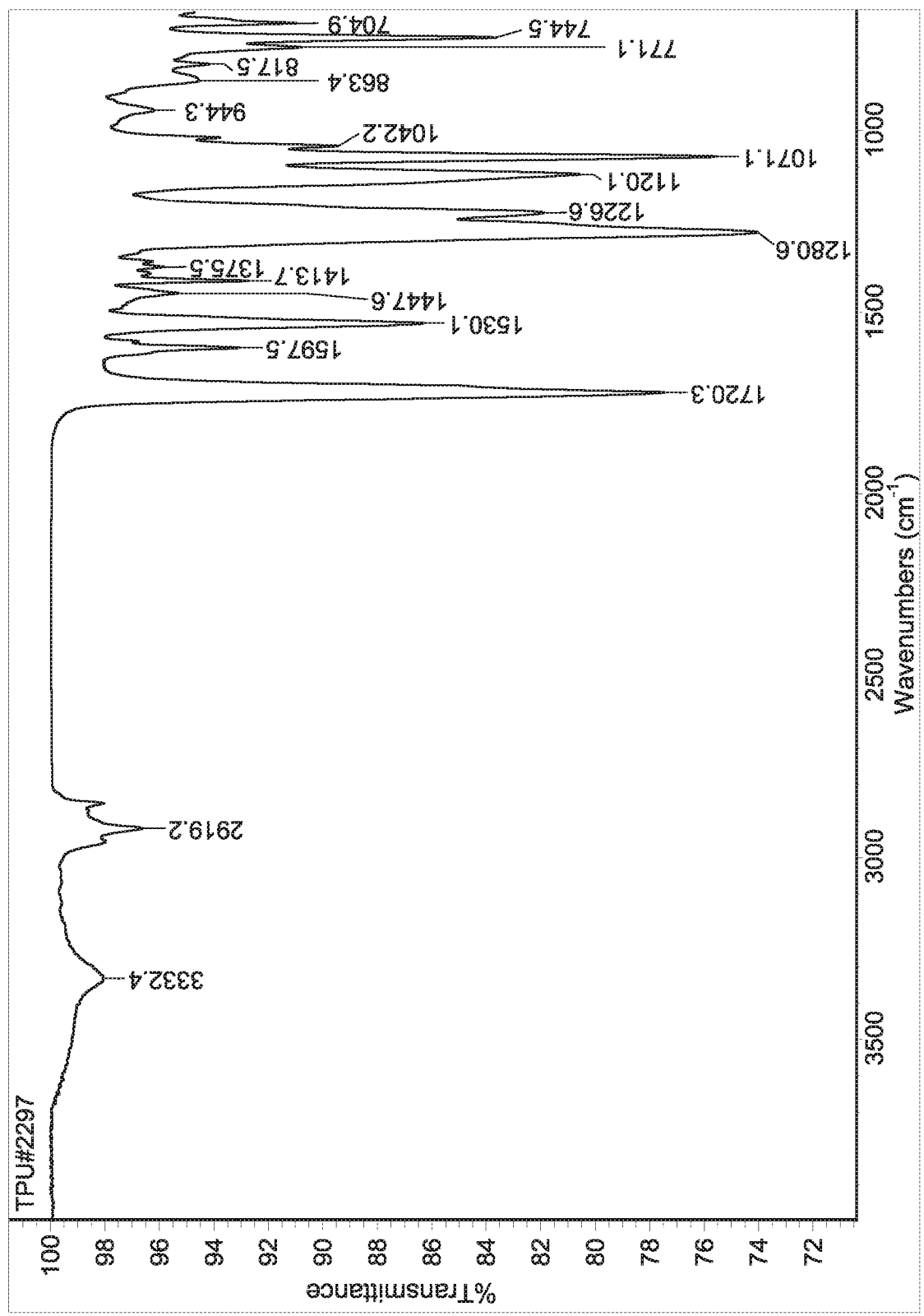
FIG. 3 is an infrared spectrum of TPU containing a dicarboxyphenyl polyester structure of Example 9.
Figure 4:
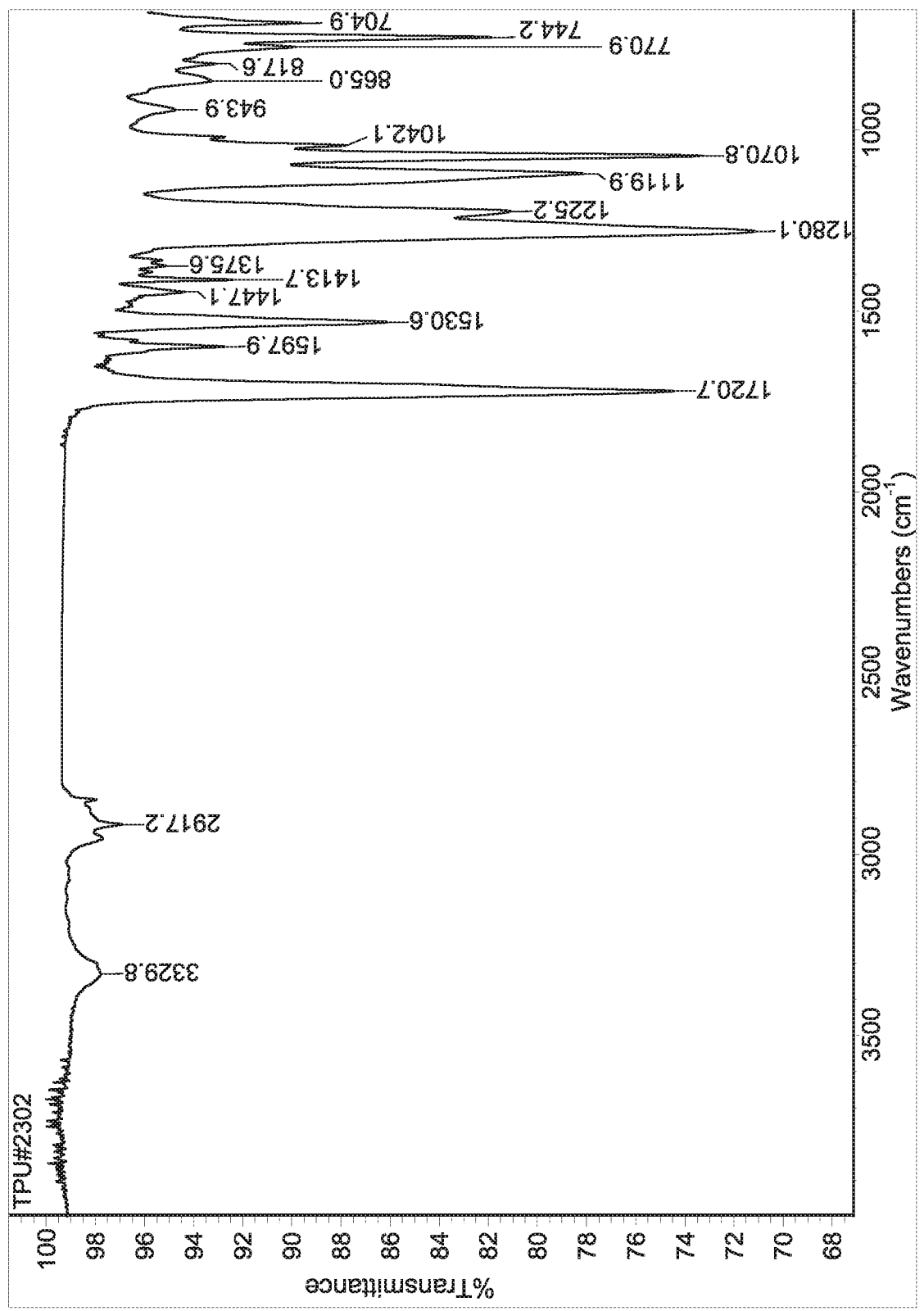
FIG. 4 is an infrared spectrum of TPU containing a dicarboxyphenyl polyester structure of Example 10.
Figure 5:
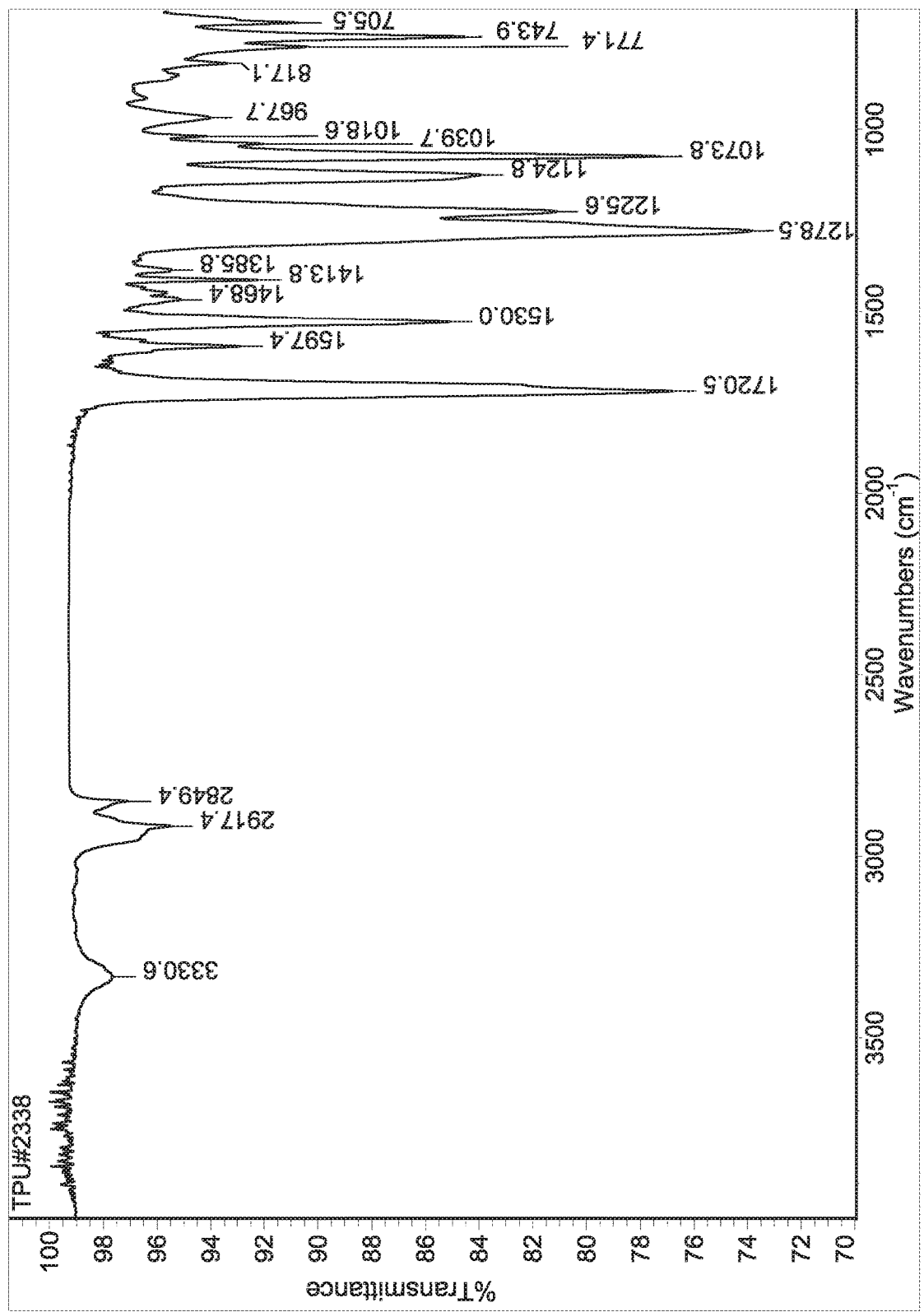
FIG. 5 is an infrared spectrum of TPU containing a dicarboxyphenyl polyester structure of Example 11.
Figure 6:
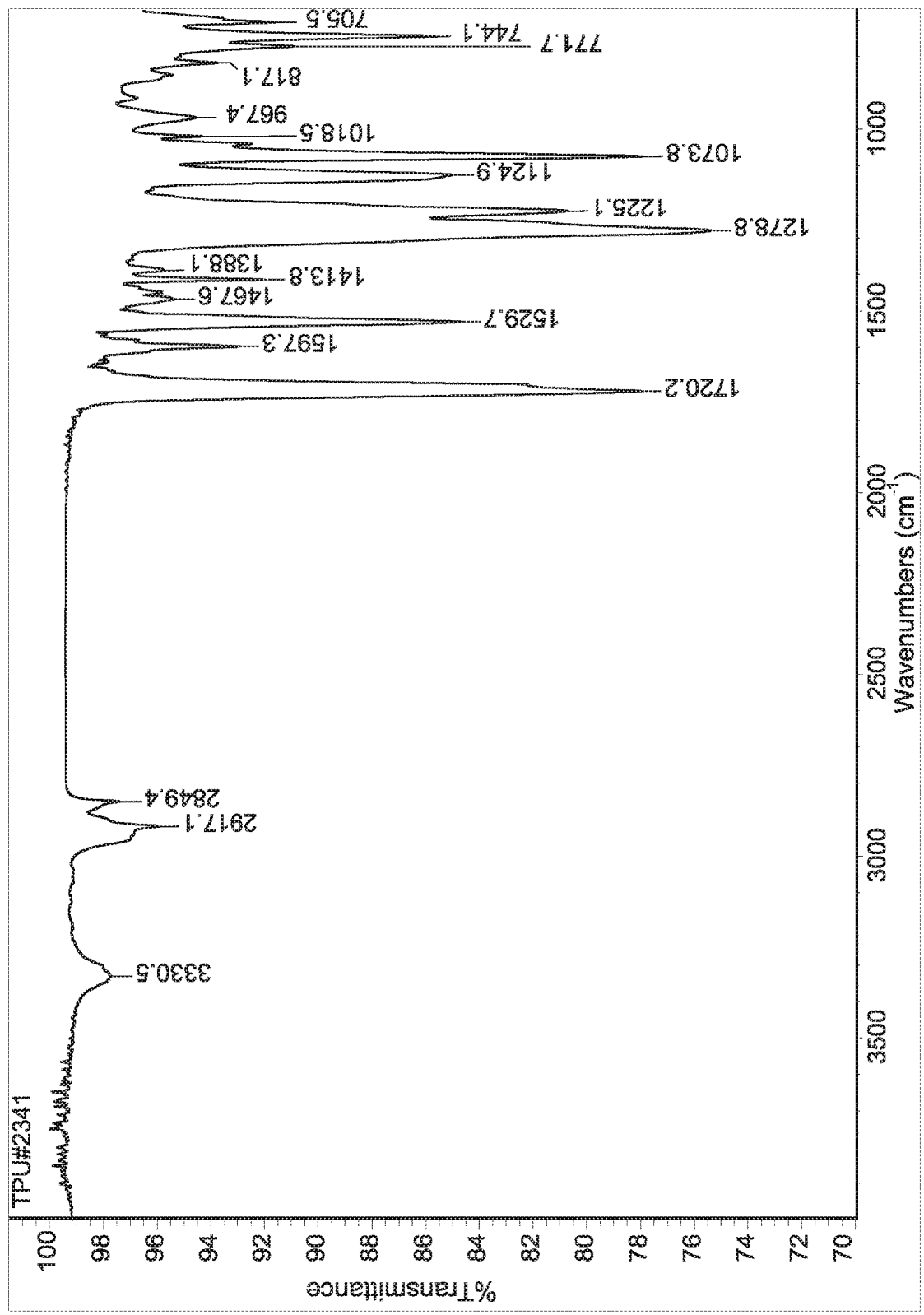
FIG. 6 is an infrared spectrum of TPU containing a dicarboxyphenyl polyester structure of Example 12.

Hereinafter, the preferred embodiments of the present invention will be described by the following examples, which are intended to illustrate and understand the invention and the invention is not limited to the embodiments. Various modifications and variations could be made in order to practice or apply the present invention without departing from the spirit and scope of the invention. In addition, all numerical ranges in the description include the upper limit and lower limit, and any integers thereof may be used as the minimum or maximum to form a narrower range.

In the present invention, the following measuring methods are used:

Fourier transform infrared spectrometer: the instrument was Thermo Nicolet 330FT-IR for surface analysis, particularly, the structural characteristics of the sample were tested by attenuation total reflection (ATR) test with a scanning range from 4000 cm$^{-1}$ to 650 cm$^{-1}$.

Differential Scanning Calorimetry (DSC)

A DSC821e differential scanning calorimeter produced by Mettler Toledo® was chosen, 5 to 10 mg samples were weighed by a microbalance scale with a sensitivity of ±0.01 mg and then put into an aluminum DSC crucible, and then the lid was firmly secured. The temperature inside the DSC chamber was set to 25° C. before use, the sample crucible and the control crucible (blank) were then placed into the DSC chamber, the nitrogen flow rate was set 80 ml per minute, the temperature was lowered at a rate of 10° C. per minute to −80° C. and maintained for 3 minutes, then increased to 220 to 250° C. at a heating rate of 10° C. per minute and maintained for 3 minutes, and then lowered at a rate of 10° C. per minute to −80° C. and maintained for 3 minutes. The peak in the process was its crystallization temperature (Tc); then increased to 220 to 250° C. secondly at a heating rate of 10° C. per minute and maintained for 3 minutes, the temperature of inflection point obtained from the process was its glass transition temperature (Tg), and the peak temperature was its melting point (Tm).

The softening point test was carried out by American Standard Method (ASTM) D1525: preparing two overlapped sheets of 2 mm hot-press test pieces, placing a needle weighing 1 kg on the test piece, putting the test piece in an oven with temperature-controlled circulation for 25 minutes, and recording the temperature of the needle which could be inserted into the test piece.

The OH value analysis was carried out in accordance with American Standard Method (ASTM) D4274-99.

The acid value analysis was carried out in accordance with American Standard Method (ASTM) D4662-15.

The Mn of Polyethylene polyol=(56100×2)/(OH value+acid value).

Viscosity analysis was performed by the Brookfield model, laminar LVDV-I.

The calculated value of phosphorus content (P wt %) in polyester polyol=[the number of raw DOPO moles×30.97]/the total weight of produced polyester polyol]×100%

The calculated value of phosphorus content (P wt %) in TPU=[(the weight of polyester polyol×the calculated value of phosphorus content in polyester polyol)/the total weight of the TPU]×100%

Gel Permeation Chromatography (GPC)

Waters 2487 was chosen and the column type was HR1/HR3/HR4. The mobile phase was tetrahydrofuran (THF) at a flow rate of 1 ml per minute to measure the number average molecular weight (Mn), weight average molecular weight (Mw) and peak molecular weight (Mp) of the sample, based on external calibration performed by polystyrene standards.

The raw materials used to produce the polyester polyol in the examples were explained below.

The polyester polyol containing a dicarboxyphenyl polyester structure, wherein the polyester polyol of 1,2-phthalic acid/diethylene glycol (CAS 25916-41-0, chemical formula: $(C_8H_6O_4 \cdot C_4H_{10}O_3)_x$) was from Stepan Company, the trade name was PD-56; the polyester polyol of 1,2-phthalic acid/hexylene glycol (CAS 27516-71-8, chemical formula: $(C_8H_6O_4 \cdot C_6H_{14}O_2)_x$) was from Stepan Company, the trade name was PH-56; the polyester polyol of 1,4-phthalic acid/1,6-adipate/diethylene glycol (chemical formula: $(C_8H_6O_4 \cdot C_6H_{10}O_4 \cdot C_6H_{14}O_2)$) was from JO-FON CHEMICAL INDUSTRY in Taiwan, the trade name was JF-022P.

PBA700 (trade name: P-700), PBA1000 (trade name: PE-14), PBA2000 (trade name: PE-24) and PEBA2000 (trade name: PE-224) were all from Sunko Company.

PTMEG1000 used in the present invention was from Mitsubishi Corporation of Japan.

The polyester polyols containing DOPO-ITA polyester structure were prepared in accordance with Examples 1 to 6 herein.

Example 1

The polyester polyol containing DOPO-ITA polyester structure was prepared by one-pot method at 140-220° C., followed by addition, condensation and dehydration. The embodiment was as follows: prepare a 3 L round bottomed flask with 4 necks which can be mechanically stirred, a fractionating tube (filled with glass beads) having a length of 30 cm, an inner diameter of 1.5 cm and an outer diameter of 4 cm, a distillation receiving flask and a thermometer; the diol was added in accordance with the raw material ratio as shown in Table 1, heated and stirred evenly, and then itaconic acid and DOPO were added in sequence, the internal temperature was raised to 140-180° C., and the distilled water was collected to more than 95% of its theoretical weight (it took 3-4 hours), heated under reduced pressure to an internal temperature of 210-215° C. for 10 hours. The reaction was monitored to have an acid value less than 1.8 mg KOH/g, and then heating was stopped and products were collected with nitrogen cooling, the finished product was weighed to calculate the yield and phosphorus content, and the appearance was recorded and the OH value, acid value and viscosity were detected. The results were shown in Table 1.

Examples 2 to 6

Except that the raw materials ratio shown in Table 1 and Table 2 were used, the others were carried out in the same manner and test method as the first embodiment. The results were shown in Table 1 and Table 2.

TABLE 1

|  | Example 1 | Example 2 | Example 3 |
|---|---|---|---|
| DOPO | 1114 g | 1144 g | 720.8 g |
|  | (5.153 mole) | (5.290 mole) | (3.329 mole) |
| Itaconic acid | 677.1 g | 694.7 g | 437.4 g |
|  | (5.205 mole) | (5.340 mole) | (3.359 mole) |
| Adipic acid | * | * | 491.2 g |
|  |  |  | (3.359 mole) |
| 1,6-hexaneglycol | 913.9 g | 865.1 g | 1049.6 g |
|  | (7.733 mole) | (7.320 mole) | (8.877 mole) |
| Tin dichloride | 33 mg | 33 mg | 0 |
| Product formula | $(C_{17}H_{15}O_6P \cdot C_6H_{14}O_2)_x$ | $(C_{17}H_{15}O_6P \cdot C_6H_{14}O_2)_x$ | $(C_{17}H_{15}O_6P \cdot C_6H_{10}O_4 \cdot C_6H_{14}O_2)_x$ |
| Product weight | 2442 g | 2423 g | 2270 g |
| (yield) | (90.3%) | (89.6%) | (84.1%) |

TABLE 1-continued

|  | Example 1 | Example 2 | Example 3 |
|---|---|---|---|
| Appearance | Near colorless transparent liquid | Light yellow transparent liquid | Near colorless transparent liquid |
| Chroma (α value) | 75 | 85 | 45 |
| OH value (mg KOH/g) | 85.4 | 58.4 | 79.9 |
| Acid value (mg KOH/g) | 1.49 | 0.87 | 1.49 |
| Molecular weight (Mn) | 1291 | 1921 | 1381 |
| Viscosity (cps) | 9545 @85° C. | 14900 @90° C. | 1974 @75° C. |
| Tg (DSC) | 9.49° C. | 15.75° C. | −27.56° C. |
| Phosphorus content | 6.54% | 6.77% | 4.55% |

TABLE 2

|  | Example 4 | Example 5 | Example 6 |
|---|---|---|---|
| DOPO | 985.7 g (4.560 mole) | 1150 g (5.320 mole) | 721.3 g (3.337 mole) |
| Itaconic acid | 593.3 g (4.560 mole) | 700.0 g (5.380 mole) | 438.5 g (3.370 mole) |
| Adipic acid | 222.3 g (1.520 mole) | * | * |
| Succinic acid | * | * | 398.0 g (3.370 mole) |
| 1,6-hexanediol | 901.1 g (7.621 mole) | * | * |
| Diethylene glycol | * | 847 g (7.982 mole) | 1061 g (9.998 mole) |
| Tin dichloride | 33 mg | 33 mg | 33 mg |
| Product formula | $(C_{17}H_{15}O_6P \cdot C_6H_{10}O_4 \cdot C_6H_{14}O_2)_x$ | $(C_{17}H_{15}O_6P \cdot C_4H_{10}O_3)_x$ | $(C_{17}H_{15}O_6P \cdot C_4H_6O_4 \cdot C_4H_{10}O_3)_x$ |
| Product weight (yield) | 2443 g (90.4%) | 2395 g (88.8%) | 2279 g (87.0%) |
| Appearance | Light yellow transparent liquid | Light yellow transparent liquid | Light yellow transparent liquid |
| Chroma (α value) | 50 | 90 | 95 |
| OH value (mg KOH/g) | 51.0 | 72.7 | 124 |
| Acid value (mg KOH/g) | 1.06 | 1.60 | 1.50 |
| Molecular weight (Mn) | 2155 | 1510 | 894 |
| Viscosity (cps) | 8687 @85° C. | 11907 @90° C. | 12926 @75° C. |
| Tg (DSC) | 0.56 | 16.69° C. | −19.06° C. |
| Phosphorus content | 5.79% | 6.89% | 4.54% |

Figure 7:
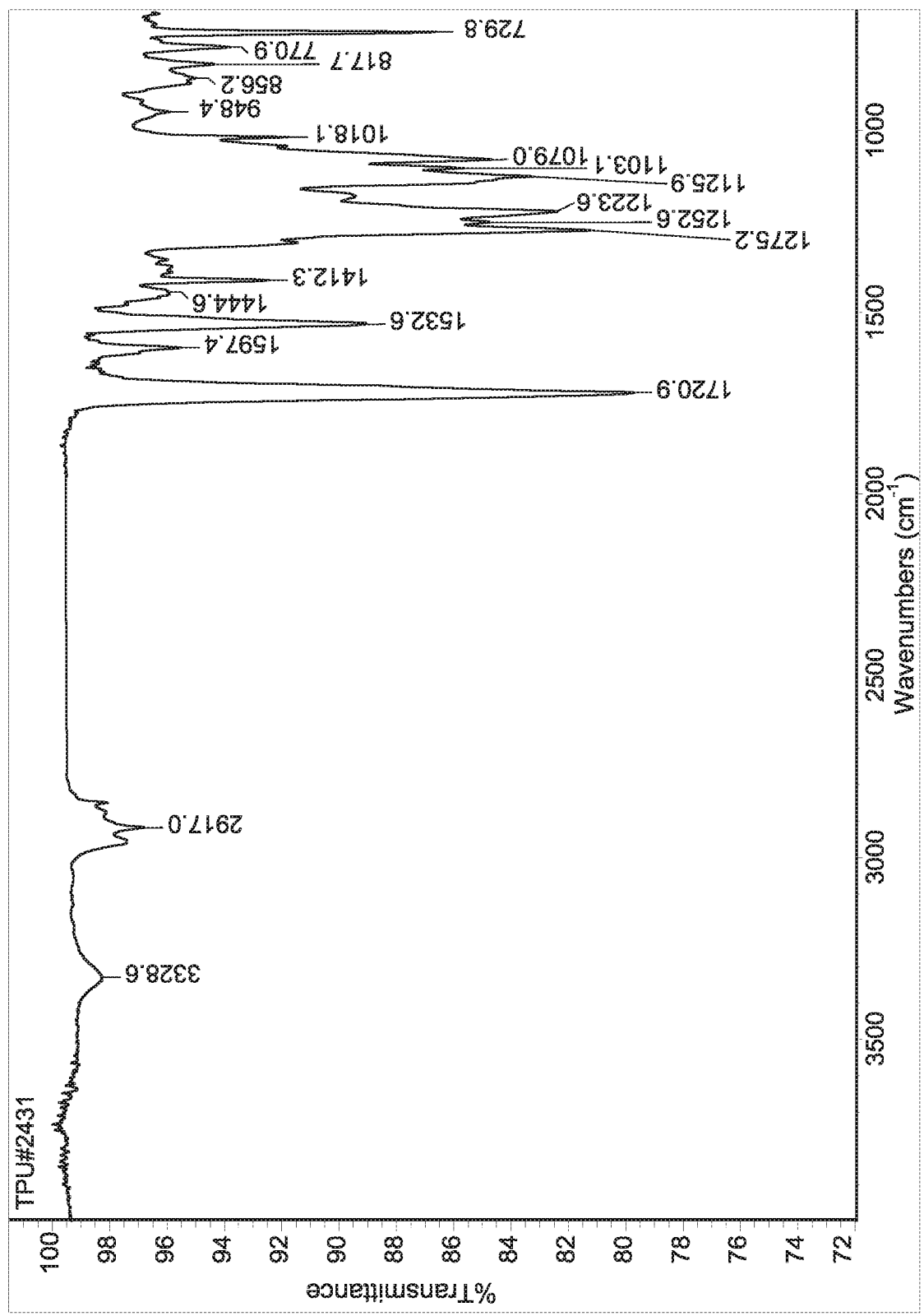
FIG. 7 is an infrared spectrum of TPU containing a dicarboxyphenyl polyester structure of Comparative Example 1.
Figure 8:
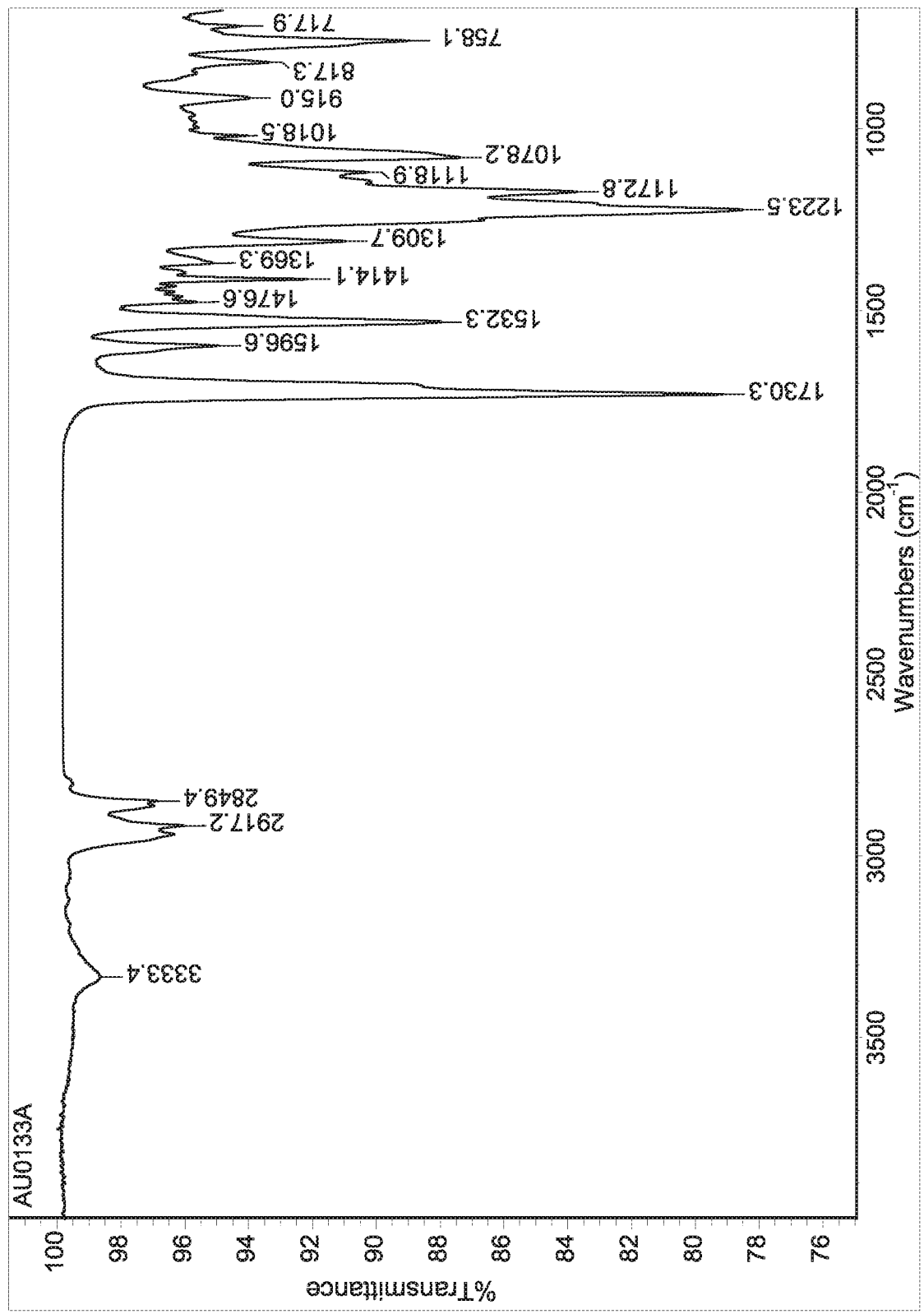
FIG. 8 is an infrared spectrum of TPU containing a DOPO-ITA polyester structure of Example 13.
Figure 9:
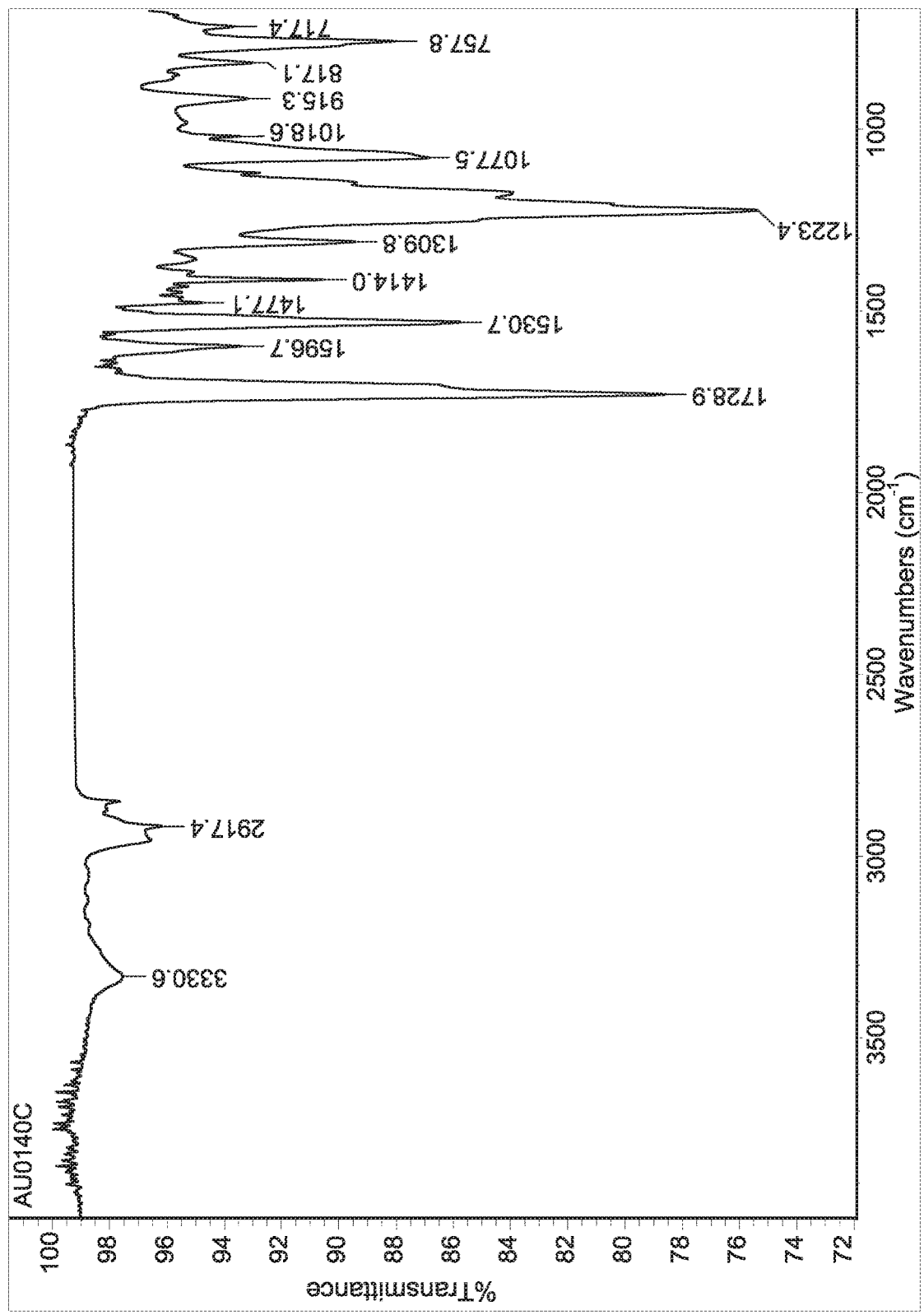
FIG. 9 is an infrared spectrum of TPU containing a DOPO-ITA polyester structure of Example 14.
Figure 10:
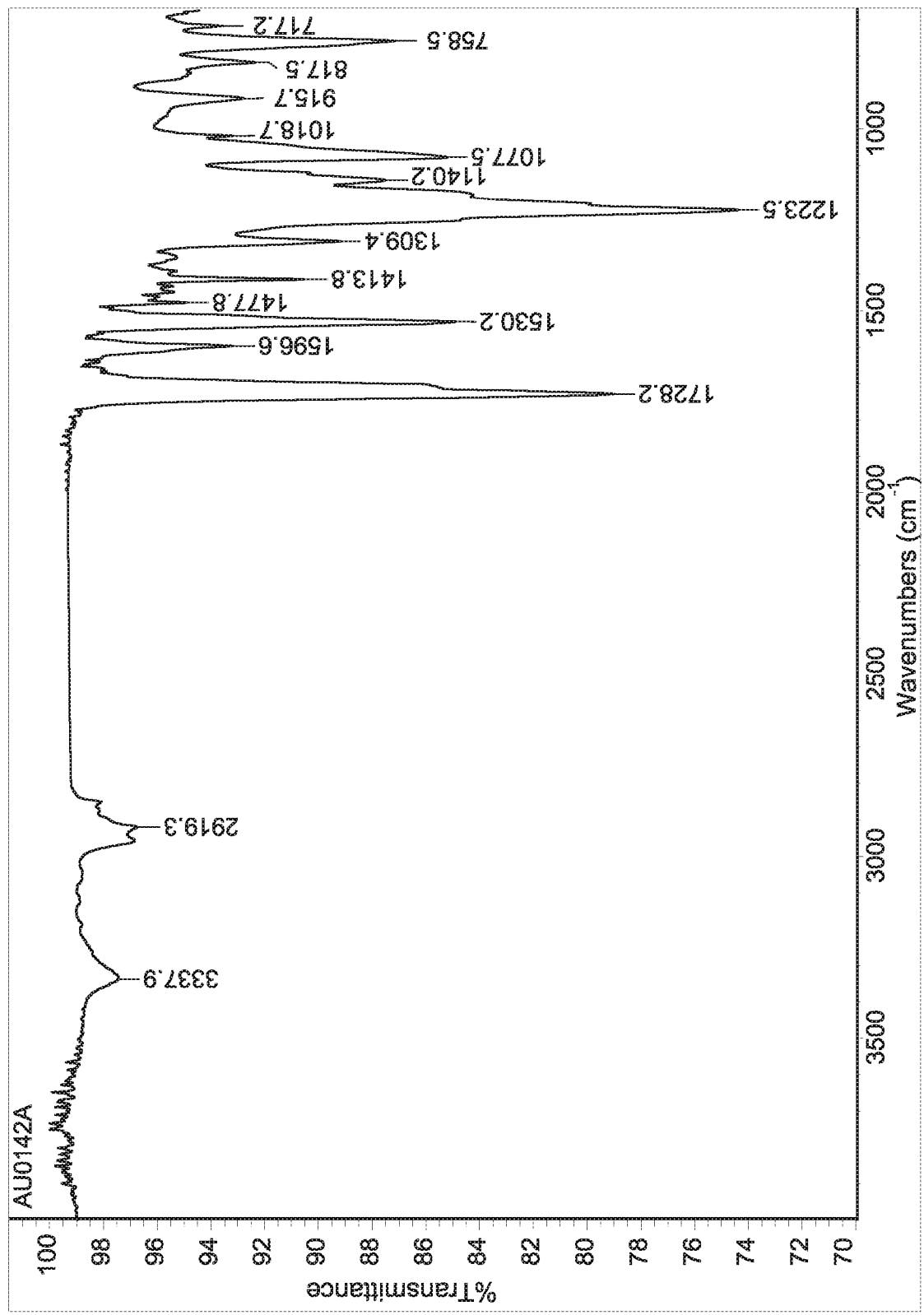
FIG. 10 is an infrared spectrum of TPU containing a DOPO-ITA polyester structure of Example 15.
Figure 11:
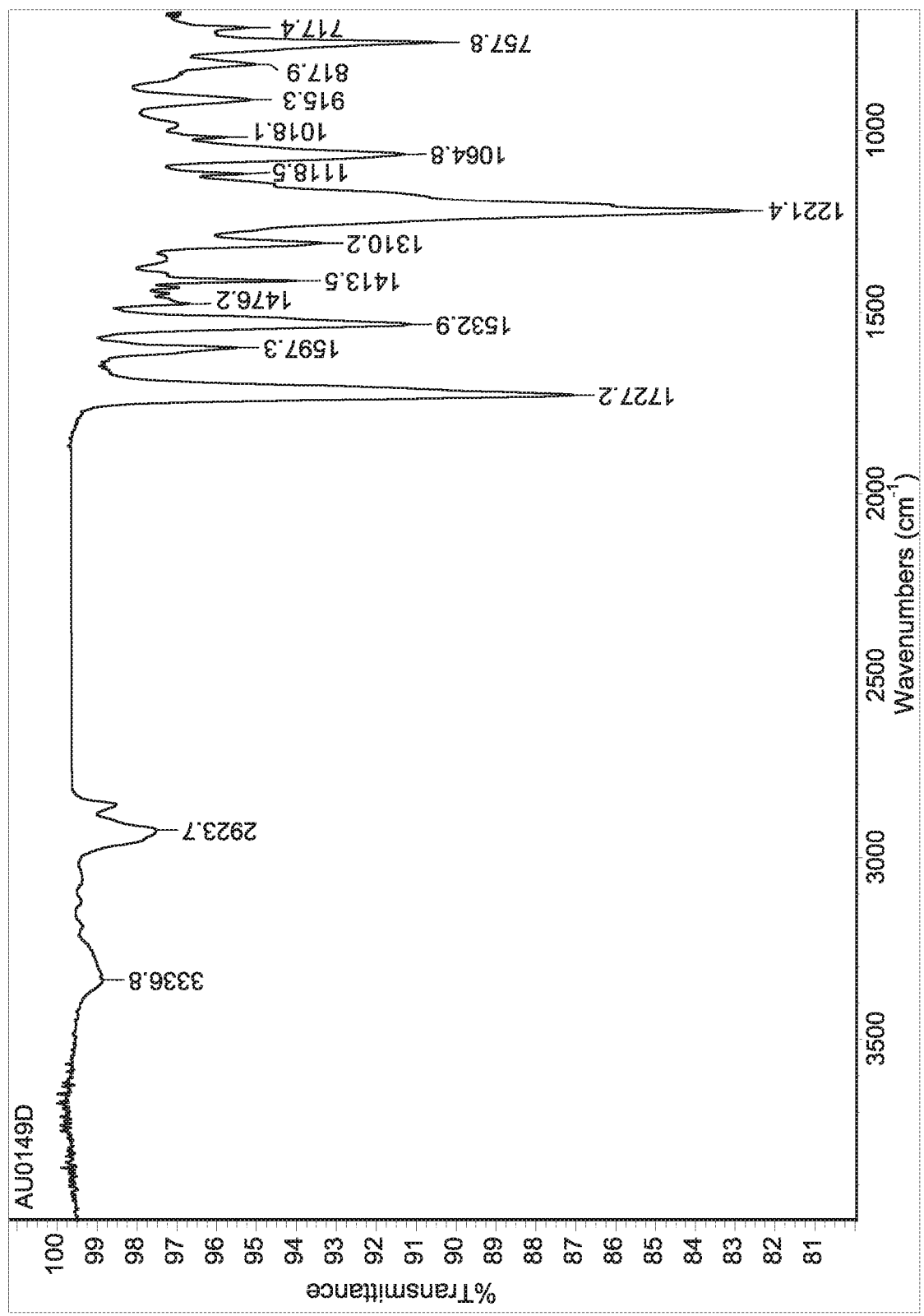
FIG. 11 is an infrared spectrum of TPU containing a DOPO-ITA polyester structure of Example 16.
Figure 12:
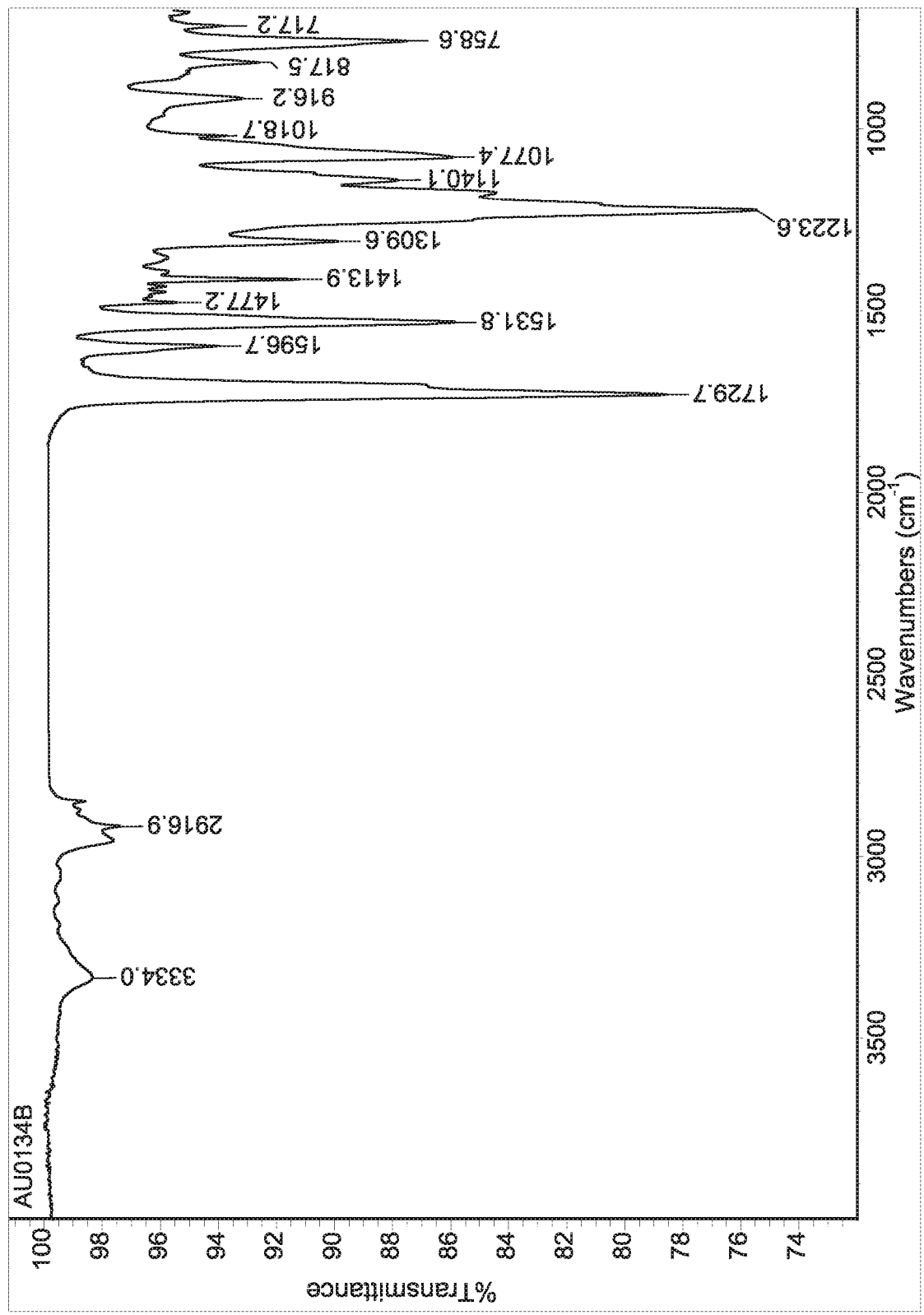
FIG. 12 is an infrared spectrum of TPU containing a DOPO-ITA polyester structure of Example 17.
Figure 13:
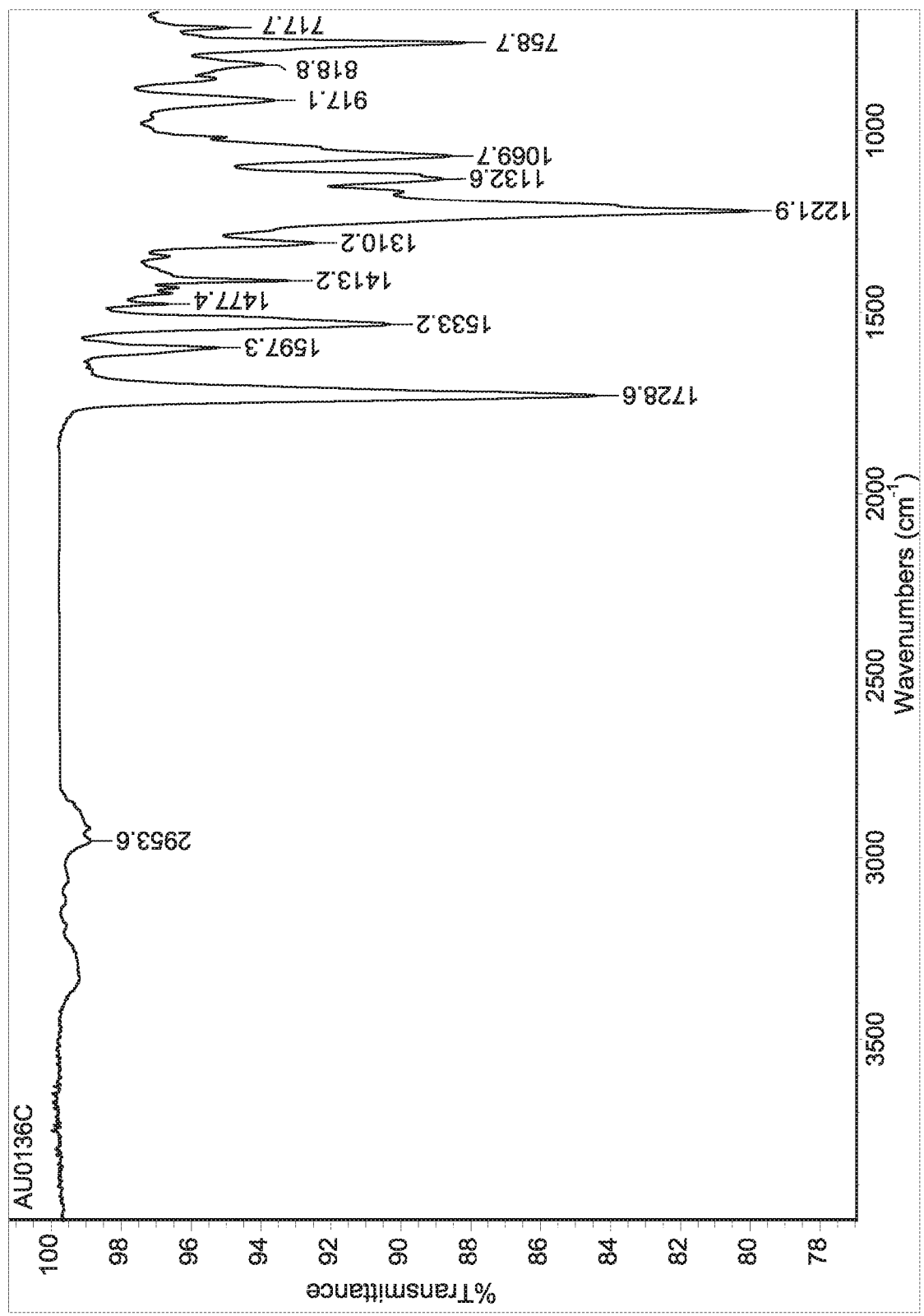
FIG. 13 is an infrared spectrum of TPU containing a DOPO-ITA polyester structure of Example 18.

A small-volume laboratory preparing method of the TPU containing a dicarboxyphenyl polyester structure was described as below (Examples 7 to 12 and Comparative Example 1): a selective composition composed of the polyester polyol containing polycarboxyphenyl group and aliphatic polyol, diol and auxiliary agent were mixed into a 1 liter metal drum, stirred mechanically at the internal temperature of 110° C. controlled by a heating plate, and then added with the MDI liquid while stirring, which was kept for 3 minutes, and the melt flow index was analyzed. At the same time, the tray was placed in a circulating oven preheated at 70° C. for 24 hours and then taken out. Record the appearance of the TPU finished product and the softness change in contact with the palm temperature, test the TPU softening point and the Tg and carry out the hydrolysis resistance test. The relevant data and results of Examples 7 to 10 were shown in Table 3, the relevant data and results of Example 11, Example 12 and Comparative Example 1 were shown in Table 4. Further, the TPU finished products (containing the dicarboxyphenyl polyester structure) obtained in Examples 7 to 12 were subjected to attenuated total reflection (ATR) test by using a Fourier transform infrared spectrometer (instrument model: Thermo Nicolet 330 FT-IR). The infrared spectrum of the obtained product was shown in FIGS. 1 to 6, the results confirmed that the finished products were thermoplastic polyurethane (TPU), and the infrared spectrum of the TPU finished product of Comparative Example 1 was shown in FIG. 7.

TABLE 3

|  | Example 7 | Example 8 | Example 9 | Example 10 |
|---|---|---|---|---|
| PD-56 | 225.9 g (0.117 mole) | 114.7 g (0.059 mole) | 275.3 g (0.142 mole) | 280.5 g (0.145 mole) |
| PTMEG1000 | * | 61.7 g (0.060 mole) | * | * |
| 1,4-butanediol | 24.1 g (0.268 mole) | 23.6 g (0.262 mole) | 24.7 g (0.275 mole) | 19.5 g (0.217 mole) |
| MDI | 95.6 g (0.382 mole) | 94.0 g (0.376 mole) | 103.4 g (0.417 mole) | 89.0 g (0.356 mole) |
| Dicarboxyphenyl polyester/TPU (mole %) | 15.2% | 7.8% | 17.0% | 20.2% |
| Weight percentage of soft segment | 65.4% | 60.0% | 68.2% | 72.1% |
| The mole ratio of MDI/(polyglycol + glycol)) | 0.993 | 0.986 | 0.991 | 0.984 |
| MI(190° C., 8700 g, 10 min) | 11.0 | 12.0 | 15.9 | 20.2 |
| Appearance | Light yellow transparent elastomer | Light yellow transparent elastomer | Light yellow transparent elastomer | Light yellow transparent elastomer |
| The softness change in contact with the palm temperature | Obvious Change (elastic) | Change (elastic) | Obvious Change (elastic) | Obvious Change (elastic) |
| The TPU softening point | 75~80° C. | 80~85° C. | 75~80° C. | 75~80° C. |
| Tg (DSC) | 31.02° C. | 12.93° C. |  | 24.38° C. |
| The 4-hour accelerated hydrolysis test at 70° C., 10 wt % NaOH (aq) | No change | No change | No change | No change |

TABLE 4

|  | Example 11 | Example 12 | Comparative Example 1 |
|---|---|---|---|
| PH-56 | 274.7 g (0.136 mole) | 225.4 g (0.111 mole) | * |
| JF-022P | * | * | 225.6 g (0.113 mole) |
| 1,4-butanediol | 25.3 g (0.281 mole) | 24.6 g (0.273 mole) | 24.4 g (0.271 mole) |
| MDI | 103.9 g (0.415 mole) | 95.9 g (0.383 mole) | 96.9 g (0.388 mole) |
| Dicarboxyphenyl polyester/TPU (mole %) | 16.3% | 14.5% | 4.9% |
| Weight percentage of soft segment | 68.0% | 65.2% | 65.0% |
| The mole ratio of MDI/(polyglycol + glycol)) | 0.996 | 0.996 | 1.009 |
| MI(190° C., 8700 g, 10 min) | 23.6 | 14.6 | 39.2 |
| Appearance | Light yellow transparent elastomer | Light yellow transparent elastomer | Light yellow transparent elastomer |
| The softness change in contact with the palm temperature | Obvious (elastic) | Obvious (elastic) | No change (elastic) |
| The TPU softening point | 80~85° C. | 80~85° C. | 80~85° C. |
| Tg (DSC) | 17.84° C. | 15.39° C. | −2.54° C. |
| The 4-hour accelerated hydrolysis test at 70° C., 10 wt % NaOH (aq) | No change | No change | Change Severe blooming |

Figure 14:
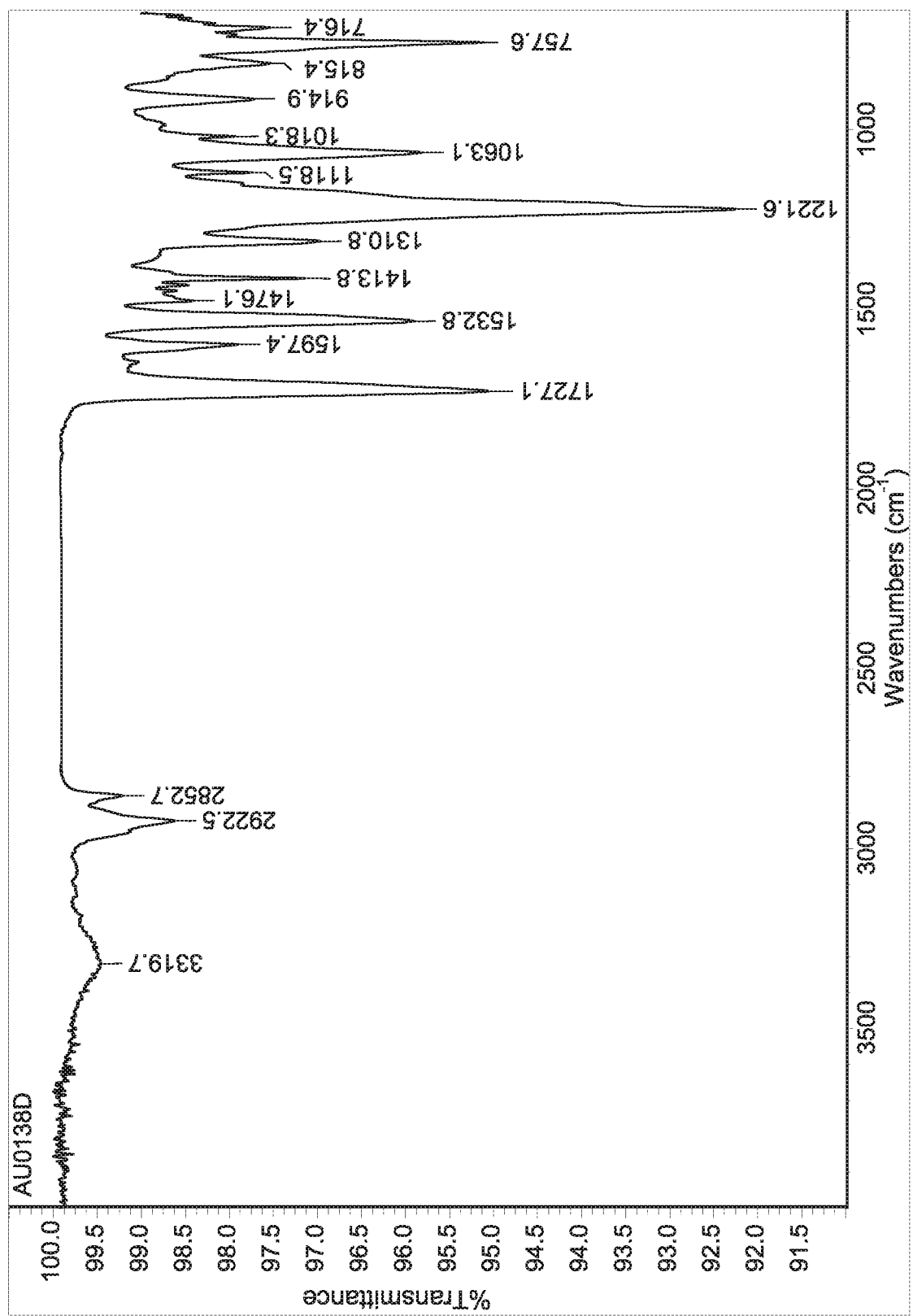
FIG. 14 is an infrared spectrum of TPU containing a DOPO-ITA polyester structure of Comparative Example 2.

A small-volume laboratory preparing method of the TPU containing a DOPO-ITA polyester structure was described below (Examples 13 to 18 and Comparative Example 2): a selective composition composed of the polyester diol containing DOPO-ITA polyester structure and aliphatic polyol, diol and auxiliary agent were mixed into a 1 liter metal drum, stirred mechanically at 110° C. of the internal temperature controlled by a heating plate, and then the MDI liquid was added while stirring, the stirring lasted for 3 minutes, the reaction mixture was poured into a tray, and the melt flow index was analyzed. At the same time, the tray was placed in a circulating oven preheated at 70° C. for 24 hours and then taken out. The appearance of the TPU finished product was recorded, the softness change thereof was measured in contact with the palm temperature, the TPU softening point and Tg were measured, and the hydrolysis resistance test was carried out. The relevant data and results of Examples 13 to 16 were shown in Table 5, and the relevant data and results of Example 17, Example 18 and Comparative Example 2 were shown in Table 6. Further, the TPU finished products (containing the DOPO-ITA polyester structure) obtained in Examples 13 to 18 were subjected to attenuated total reflection (ATR) test by using a Fourier transform infrared spectrometer (instrument model: Thermo Nicolet 330 FT-IR). The infrared spectrum of the obtained product was shown in FIGS. 8 to 13, the results confirmed that the finished products were TPU, and the infrared spectrum of the TPU finished product of Comparative Example 2 was shown in FIG. 14.

TABLE 5

|  | Example 13 | Example 14 | Example 15 | Example 16 |
|---|---|---|---|---|
| The finished product of Example 1 | 114.1 g (0.088 mole) | * | * | * |
| The finished product of Example 2 | * | 90.2 g (0.047 mole) | 115.6 g (0.060 mole) | * |
| The finished product of Example 3 | * | * | * | 230.4 g (0.167 mole) |
| PE-14 | * | * | 115.6 g (0.116 mole) | * |
| PE-24 | 114.1 g (0.054 mole) | 90.2 g (0.041 mole) | * | * |
| 1,4-butanediol | 21.9 g (0.243 mole) | 19.7 g (0.219 mole) | 18.8 g (0.209 mole) | 16.0 g (0.178 mole) |
| MDI | 95.8 g (0.383 mole) | 78.6 g (0.314 mole) | 98.2 g (0.393 mole) | 97.4 g (0.390 mole) |
| DOPO-ITA polyester/TPU (mole %) | 11.4% | 7.6% | 7.7% | 11.4% |
| Weight percentage of soft segment | 66.0% | 64.7% | 66.4% | 67.0% |
| The mole ratio of MDI/(polyol + diol)) | 0.996 | 1.021 | 1.021 | 1.129 |
| MI(190° C., 2160 g, 10 min) | 52.3 | 10.0 | 30.0 | 52.0 |
| Appearance | Light yellow transparent | Light yellow transparent | Light yellow transparent | Light yellow transparent |
| The softness change in contact with the palm temperature | Change (elastic) | Change (elastic) | Change (elastic) | Change (elastic) |
| The TPU softening point | 75~80° C. | 75~80° C. | 75~80° C. | <80° C. |
| Tg (DSC) | 14.99° C. | 35.77° C. | 15.36° C. | 30.26° C. |
| The 4-hour accelerated hydrolysis test at 70° C., 10 wt % NaOH (aq) | obviously changed into powder | obviously changed into powder | obviously changed into powder | obviously changed into powder |
| Phosphorus content | 2.16% | 2.16% | 2.36% | 2.86% |

TABLE 6

|  | Example 17 | Example 18 | Comparative Example 2 |
|---|---|---|---|
| The finished product of Example 4 | * | * | 173.4 g (0.080 mole) |
| The finished product of Example 5 | 113.5 g (0.075 mole) | * | * |
| The finished product of Example 6 | * | 239.4 g (0.268 mole) | * |
| PE-24 | 113.5 g (0.053 mole) | * | * |
| 1,4-butanediol | 23.1 g (0.257 mole) | 10.5 g (0.117 mole) | 26.8 g (0.297 mole) |
| MDI | 100.2 g (0.383 mole) | 101.5 g (0.406 mole) | 99.2 g (0.397 mole) |
| DOPO-ITA polyester/TPU (mole %) | 9.8% | 16.9% | 7.8% |
| Weight percentage of soft segment | 64.8% | 68.1% | 57.9% |
| The mole ratio of MDI/(polyol + diol)) | 1.041 | 1.06 | 1.05 |
| MI(190° C., 2160 g, 10 min) | 32.2 | 16.2 | 25.4 |
| Appearance | Yellow transparent | Yellow transparent | Near colorless transparent |
| The softness change in contact with the palm temperature | Change (elastic) | Obvious change (elastic) | No change (rigid and brittle) |
| The TPU softening point | 85~90° C. | 75~80° C. | 90~100° C. |
| Tg (DSC) | 33.06° C. | 35.10° C. | 52.49° C. |
| The 4-hour accelerated hydrolysis test at 70° C., 10 wt % NaOH (aq) | obviously changed into powder | obviously changed into powder | obviously changed into powder |
| Phosphorus content | 2.23% | 3.09% | 2.63% |

The present invention also provides a large-scale preparing method of the TPU having a dicarboxyphenyl polyester structure, which is applied to the production of a nonwoven fabric and evaluated for its performance as a hot melt adhesive. The embodiment will be described below.

Example 19: 100 kg PD-56 was added with AO-1010 and T9 and then preheated to 105° C., 1,4-butanediol was preheated to 50° C. and MDI was preheated to 70° C., wherein the flow meter showed the molar ratio of MDI/(polyester polyol+diol) was 0.955, after being mixed into a synthetic perfusion machine for high-speed mixing, the material was continuously poured in a tray coated with a release agent and kept 24 hours after shaped at the ambient temperature, and colloidal blocks were removed and granulated. The finished product was analyzed for its melt flow index and Tg.

In Example 20 and Example 21, the flow meter showed the molar ratios of the MDI/(polyester polyol+diol) were changed to 0.974 and 0.993, and the rest of the operations were the same as in Example 19.

In Comparative Example 3, an aliphatic polyester polyol composition was selected, the flow meter showed the molar ratio of the MDI/(polyester polyol+diol) was changed to 0.980, and the rest of the operations were the same as in Example 19.

The tensile strength and elongation at break tests were carried out in accordance with Japanese Industrial Standard (JIS) K7311.

Figure 15:
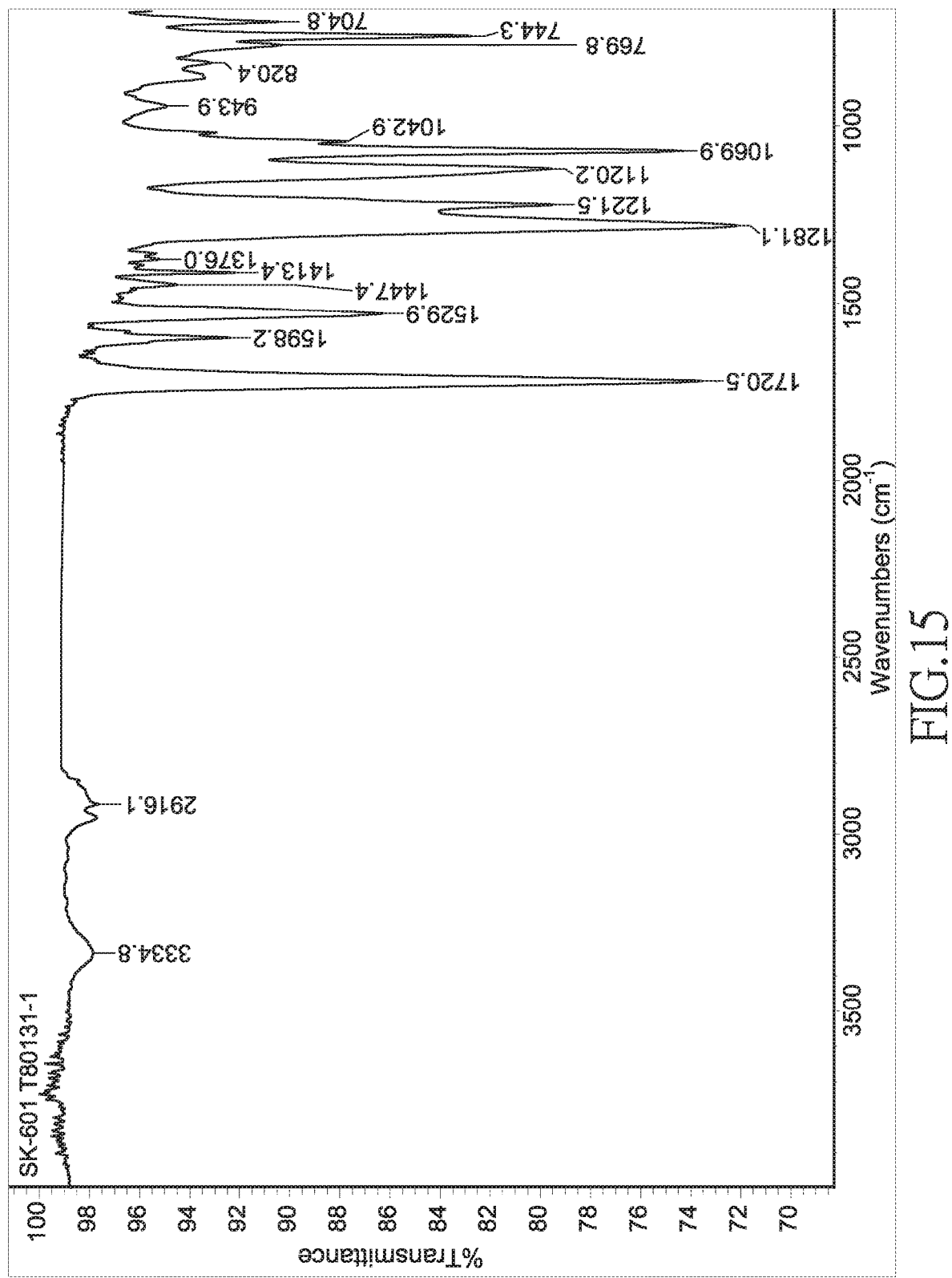
FIG. 15 is an infrared spectrum of TPU containing a dicarboxyphenyl polyester structure of Example 19.
Figure 16:
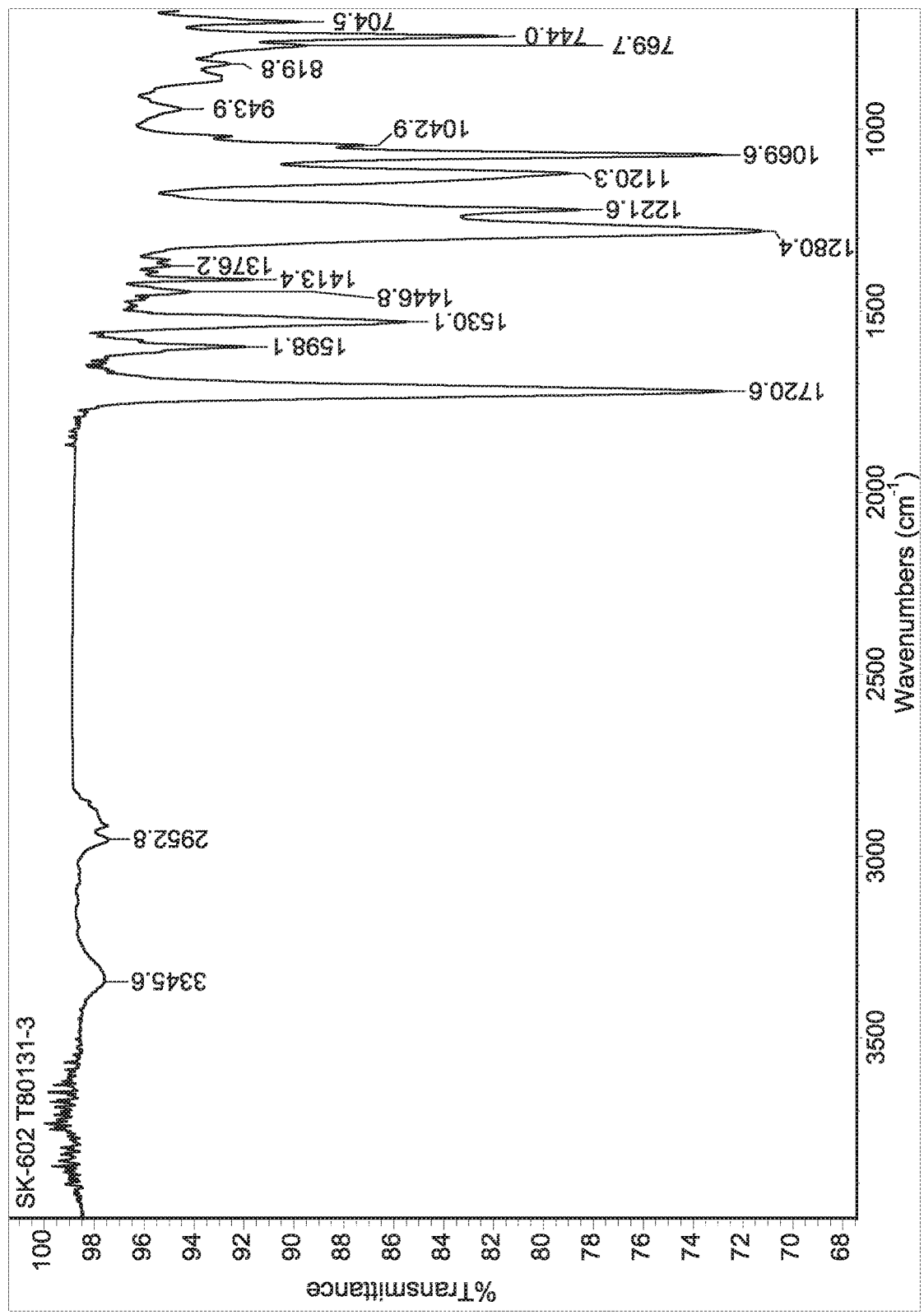
FIG. 16 is an infrared spectrum of TPU containing a dicarboxyphenyl polyester structure of Example 20.
Figure 17:
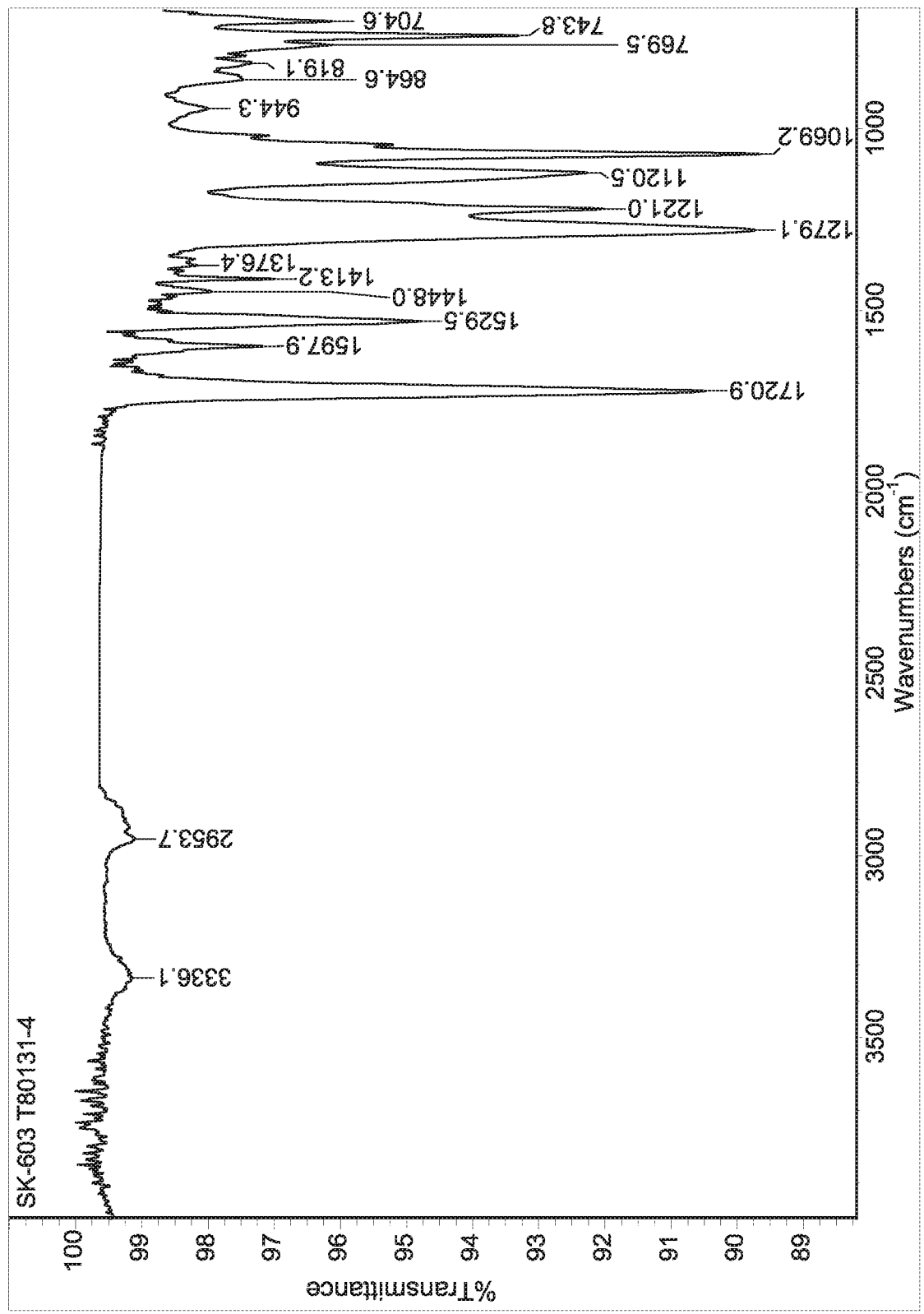
FIG. 17 is an infrared spectrum of TPU containing a dicarboxyphenyl polyester structure of Example 21.
Figure 18:
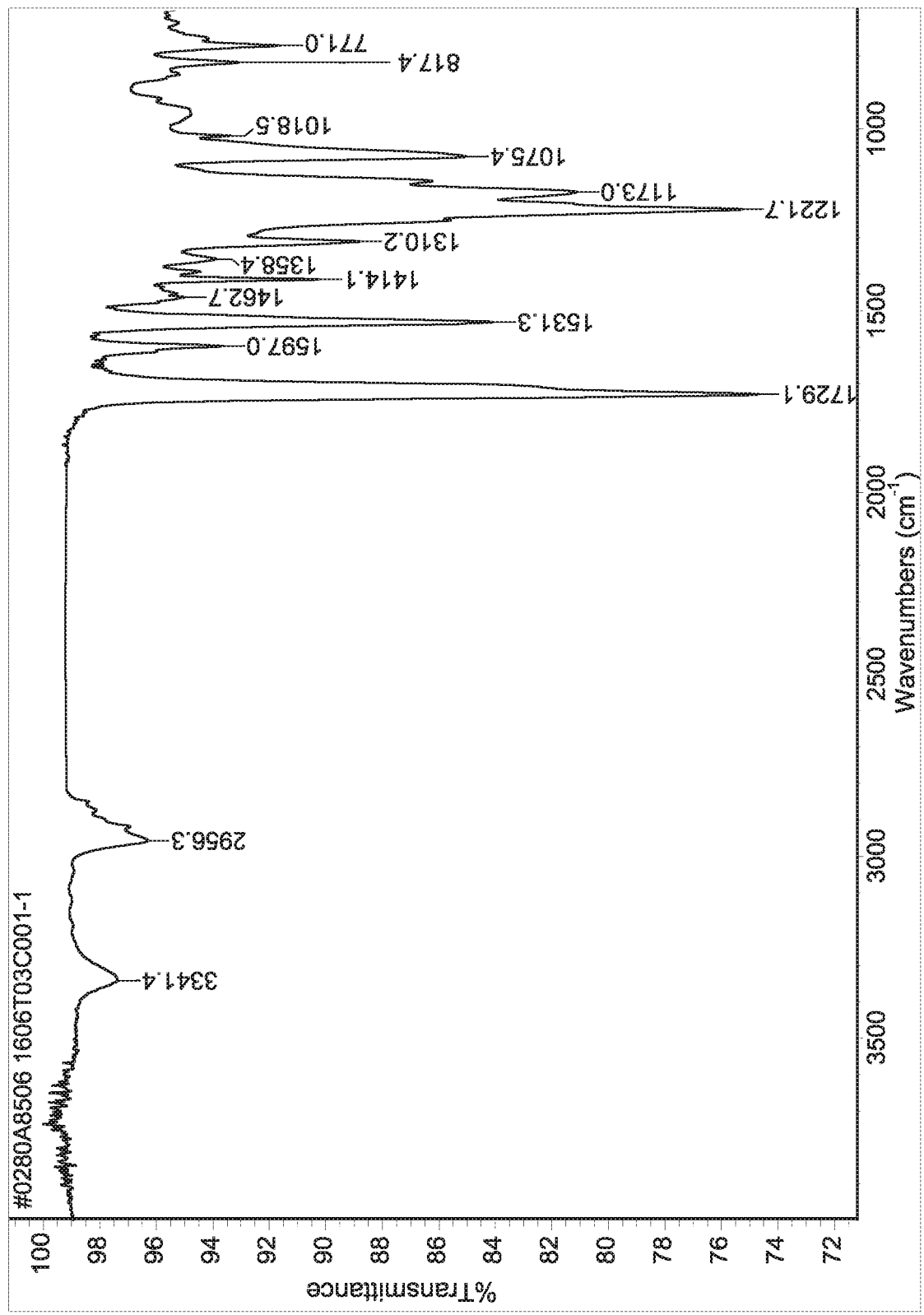
FIG. 18 is an infrared spectrum of TPU containing a dicarboxyphenyl polyester structure of Comparative Example 3.

In addition, attenuated total reflection (ATR) of the TPU product containing the dicarboxyphenyl polyester structure obtained in Examples 19 to 21 was carried out by using a Fourier transform infrared spectrometer (instrument model: Thermo Nicolet 330 FT-IR). The infrared spectrums obtained by the test were shown in FIGS. 15 to 17, which confirmed the products to be finished were TPU. Besides, the infrared spectrum of the TPU product of Comparative Example 3 was shown in FIG. 18.

TABLE 7

|  | Example 19 | Example 20 | Example 21 | Comparative Example 3 |
|---|---|---|---|---|
| PD-56 (kg/hr) | 345.00 | 345.00 | 345.00 | * |
| P700/P720(3/1) (kg/hr) | * | * | * | 345.0 |
| 1,4-butanediol(kg/hr) | 31.48 | 31.48 | 31.48 | 14.92 |
| MDI (kg/hr) | 125.20 | 127.80 | 130.30 | 137.8 |
| Weight percentage of soft segment | 68.8% | 68.4% | 68.1% | 69.3% |
| The mole ratio of MDI/(polyol + diol)) | 0.955 | 0.974 | 0.993 | 0.980 |
| Appearance | Yellowish near colorless pallets | Yellowish near colorless pallets | Yellowish near colorless pallets | Near colorless pallets |
| MI(190° C., 2160 g, 10 min) | 98.0 | 48.8 | 9.6 | 24.3 |
| Tg (DSC) | 22.3° C. | 23.1° C. | 23.9° C. | −22.6° C. |
| Rigidity (23° C.) | 65 D | 70 D | 70 D | 78 A |
| Rigidity (36° C.) | 80 A | 85 A | 86 A | 74 A |
| Tensile strength(kgf/cm$^2$) (23° C., 100 mm/min) | 243 | 261 | 365 | 252 |
| Tensile strength(kgf/cm$^2$) (36° C., 500 mm/min) | 147 | 187 | 198 | 223 |
| Elongation at break (23° C., 100 mm/min) | 220 | 123 | 61 | 832 |
| Elongation at break (36° C., 500 mm/min) | 300 | 226 | 221 | 792 |
| The softening point | 75~80° C. | 75~80° C. | 75~80° C. | 70~75° C. |
| The 4-hour accelerated hydrolysis test at 70° C., 10 wt % NaOH (aq) | No change | No change | No change | Change Severe blooming |
| the number of days that cannot be hand-teared in 90° C. hot water long-term test | 40 days | 55 days | 77 days | 8 days |
| Peel strength between TPU melt-blown nonwoven and polyester woven (kgf/cm) | 1.63 | 2.72 | 3.20 | 2.83 |
| Softness change of the joined woven at the palm temperature | The woven was relatively stiff, and became softer at the palm temperature. | The woven was relatively stiff, and became softer at the palm temperature. | The woven was relatively stiff, and became softer at the palm temperature. | The woven was soft, and no change at the palm temperature. |

The relevant data and results of Examples 19 to 21 and Comparative Example 3 were recorded in Table 7.

The rigidity, tensile strength, elongation at break, hydrolysis resistance test, and softening point test recorded in Table 7 were tested by using shots, the TPU pallets prepared by Example 19, Example 20, Example 21, and Comparative Example 3 were sampled by the Injection molding, the injection temperature was 170° C. to 205° C., and the mold temperature was 25° C. to 30° C.

The hardness was carried out in accordance with American Standard Method (ASTM) D1238.

According to Table 7, the hydrolysis time of the hot-melt adhesive containing the TPU of the present invention was at least 40 days in hot water of 90° C. By contrast, the hot-melt adhesive made of the thermoplastic polyurethane of Comparative Example 3 was hydrolyzed in 8 days. Therefore, it was concluded that the hot-melt adhesive made of the TPU having the dicarboxyphenyl polyester structure of the present invention had excellent high temperature hydrolysis resistance.

Further, the TPU pallets obtained in Example 19, Example 20, Example 21, and Comparative Example 3 were subjected to a melt-blow test at a feed temperature of 110° C. to 120° C. and a nozzle temperature of 225° C. to 235° C. The melt-blow test was carried out at a spinning pressure of 2,500 psi to 3,000 psi, and then 0.5 mm non-wovens were taken at room temperature with a roller.

According to the experiment results, the TPU pallets of Example 19, Example 20 and Example 21 were smoothly formed into silk, and could be directly collected at room temperature to obtain a TPU non-woven fabric having a smooth and stiff surface. The TPU pallets of Comparative Example 3 could be formed into silk, but the cooling and solidification speed was slow, so that the surface of the non-woven fabric had spheroidal granules, and the non-woven fabric itself was not easily separated when collected at room temperature.

On the other hand, according to the Chinese National Standard GBT 2791 test method, the TPU non-woven fabrics obtained by melt-blown in Example 19, Example 20 and Example 21 were sandwiched in two pieces of polyester woven fabric for joining test by using the hot press. The temperature was set at 130° C. for 25 seconds and the pressure was set to 5 kg/cm². The TPU non-woven fabric obtained by melt blown in Comparative Example 3 was operated as above, the temperature was set at 100° C. for 10 seconds, and the pressure was set to 5 kg/cm²; then the above-mentioned laminated fabric test piece was placed for 16 hours, then cut into 2.5 cm×12 cm strips and the peeling strength test was carried out by static hydraulic universal testing machine made by GOECH, model AI-70005, at the tensile speed of 100 mm/min. According to Table 7, the results were all above 1.6 kgf/cm, and had the function of hot melt adhesive. In particular, the woven fabric containing the thermoplastic polyurethane of the present invention as a hot melt adhesive has a relatively good appearance, and is softened when contacted with the palm or the skin, while the woven fabric containing the TPU of Comparative Example 3 as a hot melt adhesive was relatively easy to shrink and wrinkle.

Further, the large-scale preparation of the TPU containing DOPO-ITA polyester structure was the same as the above large-scale preparation of the TPU containing dicarboxyphenyl polyester structure, and therefore will not be described herein.

Further, as shown in Table 8, the TPU pallets obtained in Example 19, Example 20 and Example 21, and the TPU non-woven fabrics obtained by melt-blown were respectively analyzed by a differential scanning calorimeter (DSC) for crystallization temperature (Tc), glass transition temperature (Tg) and melting point (Tm), and analyzed by gel chromatography (GPC) for number average molecular weight (Mn), weight average molecular weight (Mw) and peak molecular weight (Mp). The molecular weight of the meltblown fabric produced by using the TPU pallets of Examples 19 to 21 was found to be higher than the TPU pallets. The detailed mechanism was not clearly understood, but the articles made of the meltblown fabric have the advantage of being strong and not easily damaged due to its large molecular weight.

TABLE 8

|  |  | Tg ° C. | Tc ° C. | Tm ° C. | GPC Mw/Mn/Mp |
|---|---|---|---|---|---|
| Example 19 | TPU pallets | 22.26 | 78.01 | 146.6 | 51598/30663/48020 |
|  | 0.5 melt-blown | 23.70 | 79.3 | 145.1 | 82366/42761/75979 |
| Example 20 | TPU pallets | 23.13 | 80.77 | 145.7 | 60790/36162/66705 |
|  | 0.5 melt-blown | 21.63 | 78.35 | 143.3 | 98378/50616/92683 |
| Example 21 | TPU pallets | 23.93 | 84.51 | 145.8 | 101896/60178/96348 |
|  | 0.5 melt-blown | 25.05 | 85.53 | 146.7 | 120294/62495/125583 |

The above embodiments can be implemented by combination as appropriate, as long as technically permitted. It should be understood by one skilled in the art that the various modifications and variations made without departing from the spirit are also included in the scope of the present invention.

The thermoplastic polyurethane of the present invention has a Tg between the ambient temperature and normal body temperature, so that the articles thereof are easily-molded, less likely to wrinkle, visually stiff when displayed or placed, and provides soft and comfortable feel when in contact with the human body, so it is especially suitable for textiles (such as underwear, hats, label cloths, curtains, etc.), shoes, decorations (such as straps, wristbands, etc.), toys, sporting goods, daily necessities and so on, so the present invention is also industrially useful.

Further, the aforementioned TPU can be prepared by the polyester polyol containing DOPO-ITA polyester structure represented by the Formula 2, so that the polyester polyol of the present invention is also industrially useful.

What is claimed is:

1. A thermoplastic polyurethane (TPU) having a glass transition temperature between an ambient temperature and normal body temperature, wherein the TPU contains a dicarboxyphenyl polyester structure represented by Formula 1 or a 10-(2,3-dicarboxypropyl)-9,10-dihydro-9-oxa-10-phosphaphenanthrene-10-oxide (DOPO-ITA) polyester structure represented by Formula 2;

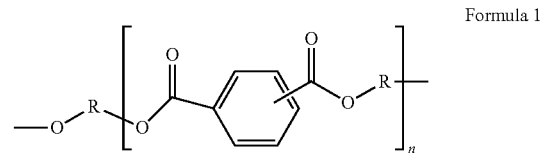

Formula 1 in Formula 1, R is C2 to C8 alkylene group or CH$_2$CH$_2$OCH$_2$CH$_2$; wherein a molar percentage of the dicarboxyphenyl polyester structure in the thermoplastic polyurethane ranges from 6% to 25%;

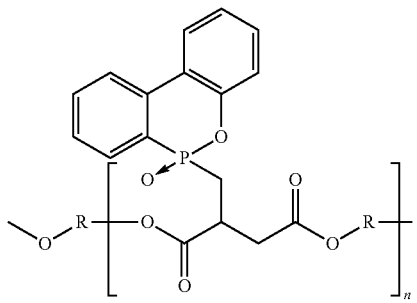

Formula 2 in Formula 2, R is C2 to C8 alkylene group or CH$_2$CH$_2$OCH$_2$CH$_2$; wherein a molar percentage of the 10-(2,3-dicarboxypropyl)-9,10-dihydro-9-oxa-10-phosphaphenanthrene-10-oxide polyester structure in the thermoplastic polyurethane ranges from 5% to 20%;

wherein the dicarboxyphenyl polyester structure represented by Formula 1 and the DOPO-ITA polyester structure represented by Formula 2 each have an average molecular weight ranging from 700 to 2500 g/mole.

wherein the TPU containing the dicarboxyphenyl polyester structure represented by Formula 1 has the glass transition temperature between 10° C. and 31.02° C.; and wherein the TPU containing the 10-(2,3-dicarboxypropyl)-9,10-dihydro-9-oxa -10-phosphaphenanthrene-10-oxide polyester structure represented by Formula 2 has the glass transition temperature between 10° C. and 40° C.

2. The thermoplastic polyurethane as claimed in claim 1, wherein a weight percentage of a soft segment in the thermoplastic polyurethane ranges from 60% to 80%.

3. The thermoplastic polyurethane as claimed in claim 1, wherein the glass transition temperature is between 15° C. and 28° C.

4. The thermoplastic polyurethane as claimed in claim 1, wherein the softening point of the TPU is between 50° C. and 100° C.

5. The thermoplastic polyurethane as claimed in claim 1, wherein the softening point of the TPU is between 60° C. and 85° C.

6. The thermoplastic polyurethane as claimed in claim 1, wherein the thermoplastic polyurethane has a function of hot melt adhesive.

7. A solvent-free hot melt adhesive, which is prepared by using the thermoplastic polyurethane as claimed in claim 1.

8. A nonwoven fabric, which is prepared by using the thermoplastic polyurethane as claimed in claim 1.

9. An article, which is prepared by using the thermoplastic polyurethane as claimed in claim 1.

10. The article as claimed in claim 9, wherein the article is textile, shoe material, decoration, toy, sporting goods or daily necessity.

11. A polyester polyol for producing the thermoplastic polyurethane (TPU) having a glass transition temperature between an ambient temperature and normal body temperature, wherein the TPU contains a dicarboxyphenyl polyester structure represented by Formula 1 or 10-(2,3-dicarboxypropyl)-9,10-dihydro-9-oxa-10-phosphaphenanthrene-10-oxide (DOPO-ITA) polyester structure represented by Formula 2;

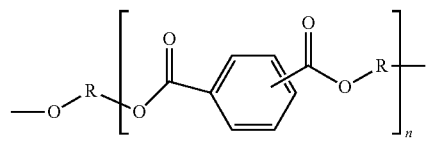

Formula 1 in Formula 1, R is C2 to C8 alkylene group or CH$_2$CH$_2$OCH$_2$CH$_2$; wherein a molar percentage of the dicarboxyphenyl polyester structure in the thermoplastic polyurethane ranges from 6% to 25%;

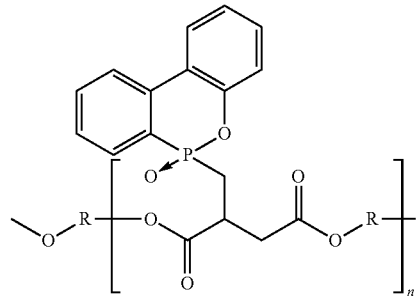

Formula 2 in Formula 2, R is C2 to C8 alkylene group or CH$_2$CH$_2$OCH$_2$CH$_2$; wherein a molar percentage of the 10-(2,3-dicarboxypropyl)-9,10-dihydro-9-oxa-10 -phosphaphenanthrene-10- oxide polyester structure in the thermoplastic polyurethane ranges from 5% to 20%;

wherein the dicarboxyphenyl polyester structure represented by Formula 1 and the DOPO-ITA polyester structure represented by Formula 2 each have an average molecular weight ranging from 700 to 2500 g/mole; and wherein the TPU contains the 10(2,3 - dicarboxypropyl)-9,10-dihydro-9-oxa-10-phosphaphenanthrene-10-oxide polyester structure represented by Formula 2, and a molar percentage of the 10-(2,3 -dicarboxypropyl)-9,10-dihydro-9-oxa-10-phosphaphenanthrene-10-oxide polyester structure contained in the polyester polyol ranges from 30% to 70%.

12. The polyester polyol as claimed in claim 11, wherein the polyester polyol has an OH value between 160.3 and 44.8 mg of potassium hydroxide per gram.

13. The polyester polyol as claimed in claim 11, wherein a dicarboxylic acid contained in the 10-(2,3-dicarboxypropyl)-9,10-dihydro-9-oxa-10-phosphaphenanthrene-10-oxide (DOPO-ITA) polyester structure is an addition of itaconic acid and 9,10-dihydro-9-oxa-10-phosphaphenanthrene-10-oxide (DOPO), or an addition of itaconic acid, one selected from succinic acid or 1,6-adipic acid and 9,10-dihydro-9-oxa-10-phosphaphenanthrene-10-oxide (DOPO).

14. The polyester polyol as claimed in claim 11, wherein a diol monomer of the polyester polyol is a C2-C8 aliphatic polyol.

15. The polyester polyol as claimed in claim 14, wherein the C2-C8 aliphatic polyol is ethylene glycol, 1,2-propylene glycol, 1,3-propylene glycol, butanediol, 2-methyl-1,3-propanediol, diethylene glycol, 1,5-pentanediol, neopentyl glycol, 1,6-hexanediol, 1,4-cyclohexanediol, 2-ethylhexanediol, 1,8-octane diol or a combination thereof.

16. The polyester polyol as claimed in claim 11, wherein the polyester polyol is represented by any one of the following Formula 3 or any combinations thereof:
Formula 3
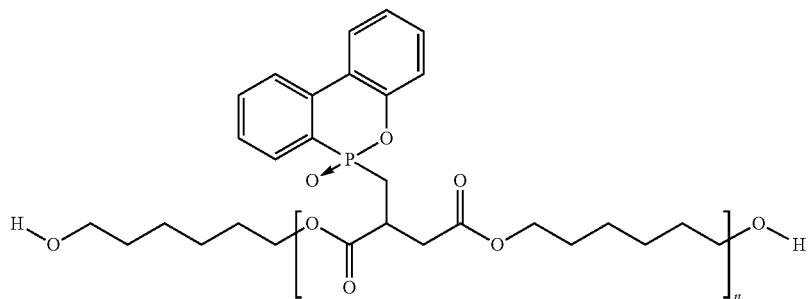
$(C_{17}H_{15}O_6P \cdot C_6H_{14}O_2)_x$
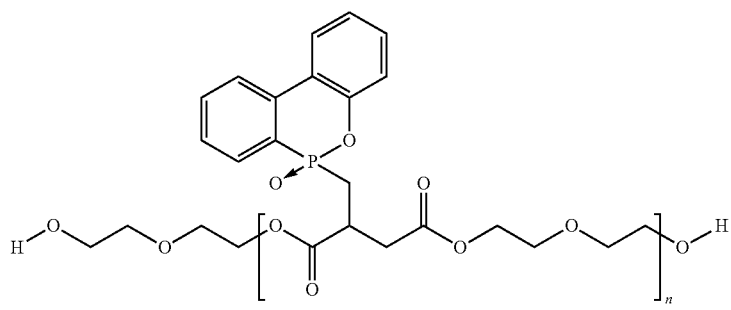
$(C_{17}H_{15}O_6P \cdot C_6H_{10}O_3)_x$
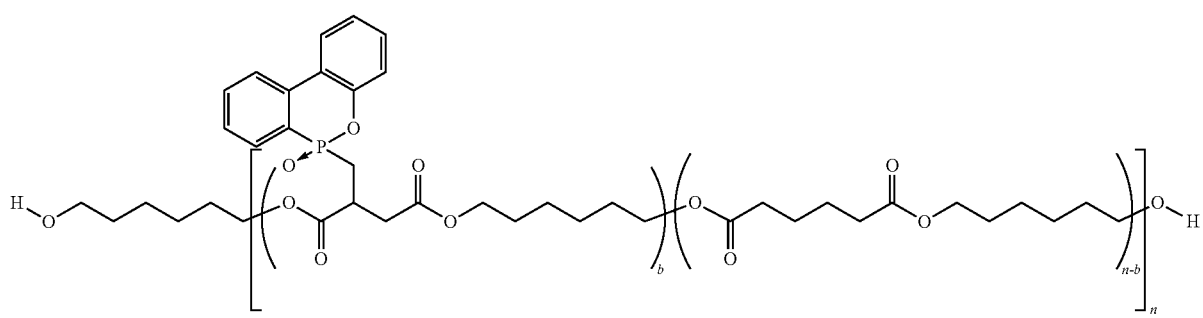
$(C_{17}H_{15}O_6P \cdot C_6H_{10}O_4 \cdot C_6H_{14}O_2)_x$
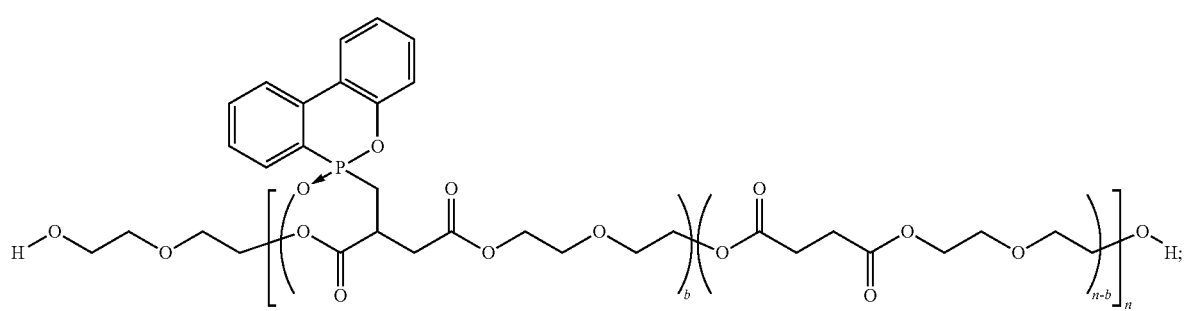
$(C_{17}H_{15}O_6P \cdot C_4H_6O_4 \cdot C_4H_{10}O_3)_x$ wherein n ranges from 1 to 10, x ranges from 1 to 10, and b ranges from 1 to 6.

17. The polyester polyol as claimed in claim 16, wherein the polyester polyol has an acid value less than 1.8 mg KOH/g.

18. A thermoplastic polyurethane (TPU) having a glass transition temperature between an ambient temperature and normal body temperature, wherein the TPU contains a dicarboxyphenyl polyester structure represented by Formula 1 or a 10-(2,3-dicarboxypropyl)-9,10-dihydro-9-oxa-10-phosphaphenanthrene-10-oxide (DOPO-ITA) polyester structure represented by Formula 2;

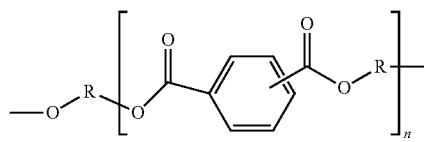

Formula 1 in Formula 1, R is C2 to C8 alkylene group or $CH_2CH_2OCH_2CH_2$; wherein a molar percentage of the dicarboxyphenyl polyester structure in the thermoplastic polyurethane ranges from 6% to 25%;

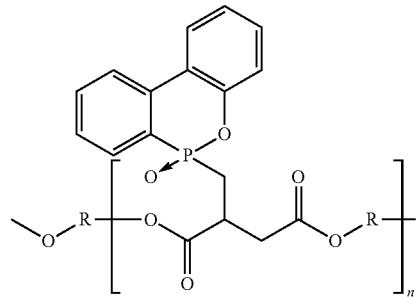

Formula 2 in Formula 2, R is C2 to C8 alkylene group or $CH_2CH_2OCH_2CH_2$; wherein a molar percentage of the 10-(2,3-dicarboxypropyl)-9,10-dihydro-9-oxa-10-phosphaphenanthrene-10-oxide polyester structure in the thermoplastic polyurethane ranges from 5% to 20%;

wherein the dicarboxyphenyl polyester structure represented by Formula 1 and the DOPO-ITA polyester structure represented by Formula 2 each have an average molecular weight ranging from 700 to 2500 g/mole; and wherein a molar percentage of the 10-(2,3-dicarboxypropyl)-9,10-dihydro-9-oxa-10-phosphaphenanthrene-10-oxide polyester structure in the thermoplastic polyurethane ranges from 5% to 20%.

* * * * *